US012585028B1

(12) United States Patent
Saldanha Tavares et al.

(10) Patent No.: US 12,585,028 B1
(45) Date of Patent: Mar. 24, 2026

(54) MOBILE CUSTOMER TERMINALS (CTS) OPERATION IN AN GLOBAL NAVIGATION SATELLITE SYSTEM (GNSS) OUTAGE

(71) Applicant: Amazon Technologies, Inc., Seattle, WA (US)

(72) Inventors: Marcos Bruno Saldanha Tavares, Bothell, WA (US); Aditya Chopra, Austin, TX (US); Arunabha Ghosh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 18/118,493

(22) Filed: Mar. 7, 2023

(51) Int. Cl.
| | |
|---|---|
| *G01S 19/25* | (2010.01) |
| *G01S 19/05* | (2010.01) |
| *G01S 19/11* | (2010.01) |
| *G01S 19/29* | (2010.01) |

(52) U.S. Cl.
CPC ............ *G01S 19/256* (2013.01); *G01S 19/05* (2013.01); *G01S 19/115* (2019.08); *G01S 19/29* (2013.01)

(58) Field of Classification Search
CPC ...... G01S 19/256; G01S 19/115; G01S 19/05; G01S 19/29
See application file for complete search history.

(56) References Cited

U.S. PATENT DOCUMENTS

| | | | | |
|---|---|---|---|---|
| 11,985,611 | B1 * | 5/2024 | Worters | ............ H04W 56/0055 |
| 2019/0146092 | A1 * | 5/2019 | MacDonald | ............ G01S 19/08 |
| | | | | 342/357.44 |

| | | | | |
|---|---|---|---|---|
| 2021/0190963 | A1 * | 6/2021 | Hua | ........................ G01S 19/08 |
| 2023/0047458 | A1 * | 2/2023 | Akkarakaran | ........ H04W 24/04 |
| 2024/0241265 | A1 * | 7/2024 | Peng | ........................ G01S 19/37 |
| 2024/0276439 | A1 * | 8/2024 | Peng | ................... H04W 64/003 |

FOREIGN PATENT DOCUMENTS

| | | | | | |
|---|---|---|---|---|---|
| GB | | 2626378 | A * | 7/2024 | ............. H04B 7/088 |
| WO | WO-2019068431 | A1 * | | 4/2019 | ............. H04J 3/0688 |

OTHER PUBLICATIONS

18118493_2025-05-01_WO_2019068431_A1_M.pdf, machine translation of WO-2019068431-A1 (Year: 2019).*

* cited by examiner

*Primary Examiner* — William Kelleher
*Assistant Examiner* — Kenneth W Good
(74) *Attorney, Agent, or Firm* — Kilpatrick Townsend & Stockton LLP

(57) ABSTRACT

Technologies directed to a customer terminal (CT) establishing and maintaining a communication link with a satellite (SAT) in a satellite network during a Global navigation satellite system (GNSS) outage are described. One method includes establishing a communication link using position and velocity information of the CT. The method receives, at a first time, first timing information from a GNSS and updates a first clock of the CT accordingly. The method determines, at a second time after the first time, second timing information representing a clock drift between the first clock of the CT and a second clock of the SAT. The second timing information is derived from messages exchanged between the SAT and the CT prior to the second time. The method updates, using the second timing information, the first clock of the CT.

20 Claims, 13 Drawing Sheets

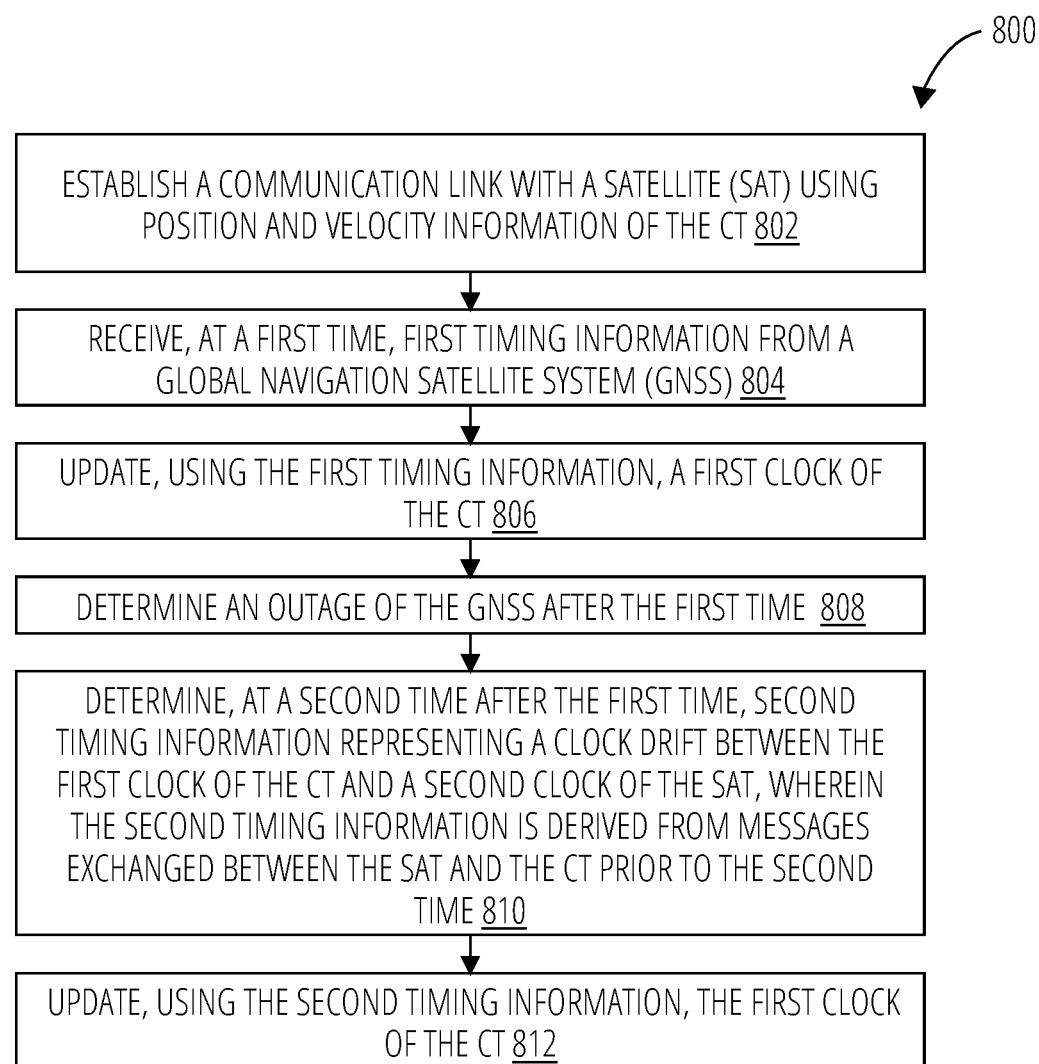

ESTABLISH A COMMUNICATION LINK WITH A SATELLITE (SAT) USING POSITION AND VELOCITY INFORMATION OF THE CT 802

RECEIVE, AT A FIRST TIME, FIRST TIMING INFORMATION FROM A GLOBAL NAVIGATION SATELLITE SYSTEM (GNSS) 804

UPDATE, USING THE FIRST TIMING INFORMATION, A FIRST CLOCK OF THE CT 806

DETERMINE AN OUTAGE OF THE GNSS AFTER THE FIRST TIME 808

DETERMINE, AT A SECOND TIME AFTER THE FIRST TIME, SECOND TIMING INFORMATION REPRESENTING A CLOCK DRIFT BETWEEN THE FIRST CLOCK OF THE CT AND A SECOND CLOCK OF THE SAT, WHEREIN THE SECOND TIMING INFORMATION IS DERIVED FROM MESSAGES EXCHANGED BETWEEN THE SAT AND THE CT PRIOR TO THE SECOND TIME 810

UPDATE, USING THE SECOND TIMING INFORMATION, THE FIRST CLOCK OF THE CT 812

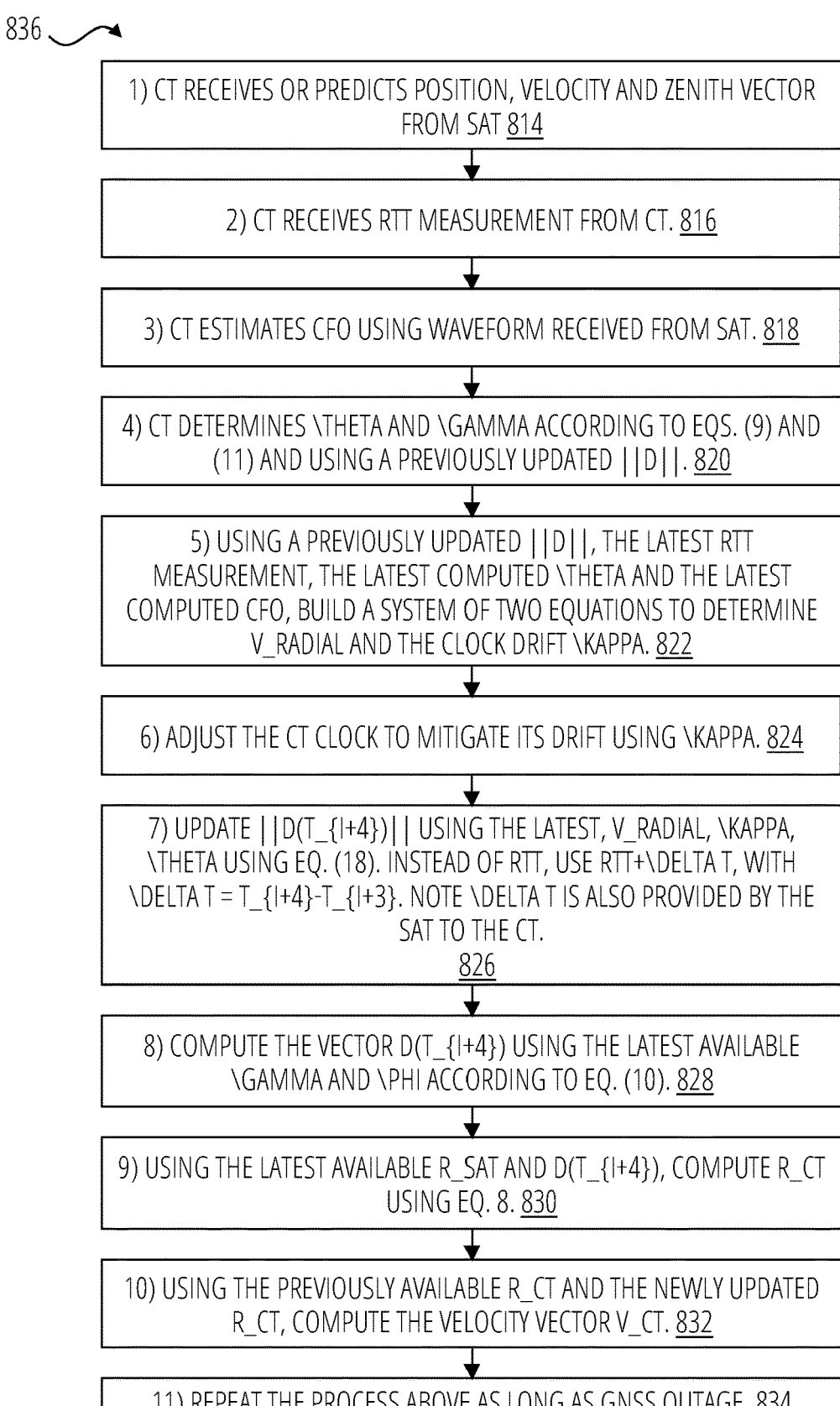

1) CT RECEIVES OR PREDICTS POSITION, VELOCITY AND ZENITH VECTOR FROM SAT 814

2) CT RECEIVES RTT MEASUREMENT FROM CT. 816

3) CT ESTIMATES CFO USING WAVEFORM RECEIVED FROM SAT. 818

4) CT DETERMINES \THETA AND \GAMMA ACCORDING TO EQS. (9) AND (11) AND USING A PREVIOUSLY UPDATED ||D||. 820

5) USING A PREVIOUSLY UPDATED ||D||, THE LATEST RTT MEASUREMENT, THE LATEST COMPUTED \THETA AND THE LATEST COMPUTED CFO, BUILD A SYSTEM OF TWO EQUATIONS TO DETERMINE V_RADIAL AND THE CLOCK DRIFT \KAPPA. 822

6) ADJUST THE CT CLOCK TO MITIGATE ITS DRIFT USING \KAPPA. 824

7) UPDATE ||D(T_{I+4})|| USING THE LATEST, V_RADIAL, \KAPPA, \THETA USING EQ. (18). INSTEAD OF RTT, USE RTT+\DELTA T, WITH \DELTA T = T_{I+4}-T_{I+3}. NOTE \DELTA T IS ALSO PROVIDED BY THE SAT TO THE CT.
826

8) COMPUTE THE VECTOR D(T_{I+4}) USING THE LATEST AVAILABLE \GAMMA AND \PHI ACCORDING TO EQ. (10). 828

9) USING THE LATEST AVAILABLE R_SAT AND D(T_{I+4}), COMPUTE R_CT USING EQ. 8. 830

10) USING THE PREVIOUSLY AVAILABLE R_CT AND THE NEWLY UPDATED R_CT, COMPUTE THE VELOCITY VECTOR V_CT. 832

11) REPEAT THE PROCESS ABOVE AS LONG AS GNSS OUTAGE. 834

FIG. 8B

MOBILE CUSTOMER TERMINALS (CTS) OPERATION IN AN GLOBAL NAVIGATION SATELLITE SYSTEM (GNSS) OUTAGE

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of the digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 8A is a flow diagram of a method for updating a clock of a CT in a GNSS outage according to at least one embodiment.

FIG. 8B is a flow diagram of a method for maintaining a communication link with a SAT in a GNSS outage according to at least one embodiment.

DETAILED DESCRIPTION

Technologies directed to a CT establishing and maintaining a communication link with a satellite (SAT) in a satellite network during a Global navigation satellite system (GNSS) outage are described. A GNSS is a system of satellites that provides positioning, navigation, and timing (PNT) services on a global or regional basis. The United States' Global Positioning System (GPS) is the most prevalent GNSS, but there are others. Conventionally, a CT can use PNT information to establish and maintain a communication link with a SAT in a satellite network. However, there are instances where the CT has a GNSS outage where the PNT information is not accessible to establish and maintain the communication link.

Aspects and embodiments of the present disclosure overcome these deficiencies and others by providing a solution that enables CTs to maintain communication links in a satellite network during a GNSS outage. A CT is a communication device that may include an array antenna, beamforming circuitry coupled to the array antenna, and a processing device coupled to the beamforming circuitry. Aspects and embodiments of the present disclosure can replace the GNSS as the source of timing truth by timing references provided by the SATs in the satellite network. Aspects and embodiments of the present disclosure can provide a source of timing truth using closed-loops between the CTs and their anchor SATs in a GNNS outage. Aspects and embodiments of the present disclosure can measure timing quantities at the anchor SATs, and the anchor SATs can provide these timing quantities to the CTs on a frequent basis. Given these timing quantities from the anchor SATs, the CTs perform corresponding periodic adjustments in their clocks to keep them within system requirements. Furthermore, the CTs can perform updates of their positions and velocities such that beam-pointing operations and handovers are also enabled during the GNSS outage. For this solution, it is assumed that the anchor SATs have their GNSS in unimpaired conditions from which they derive their own timing truth.

Figure 1:
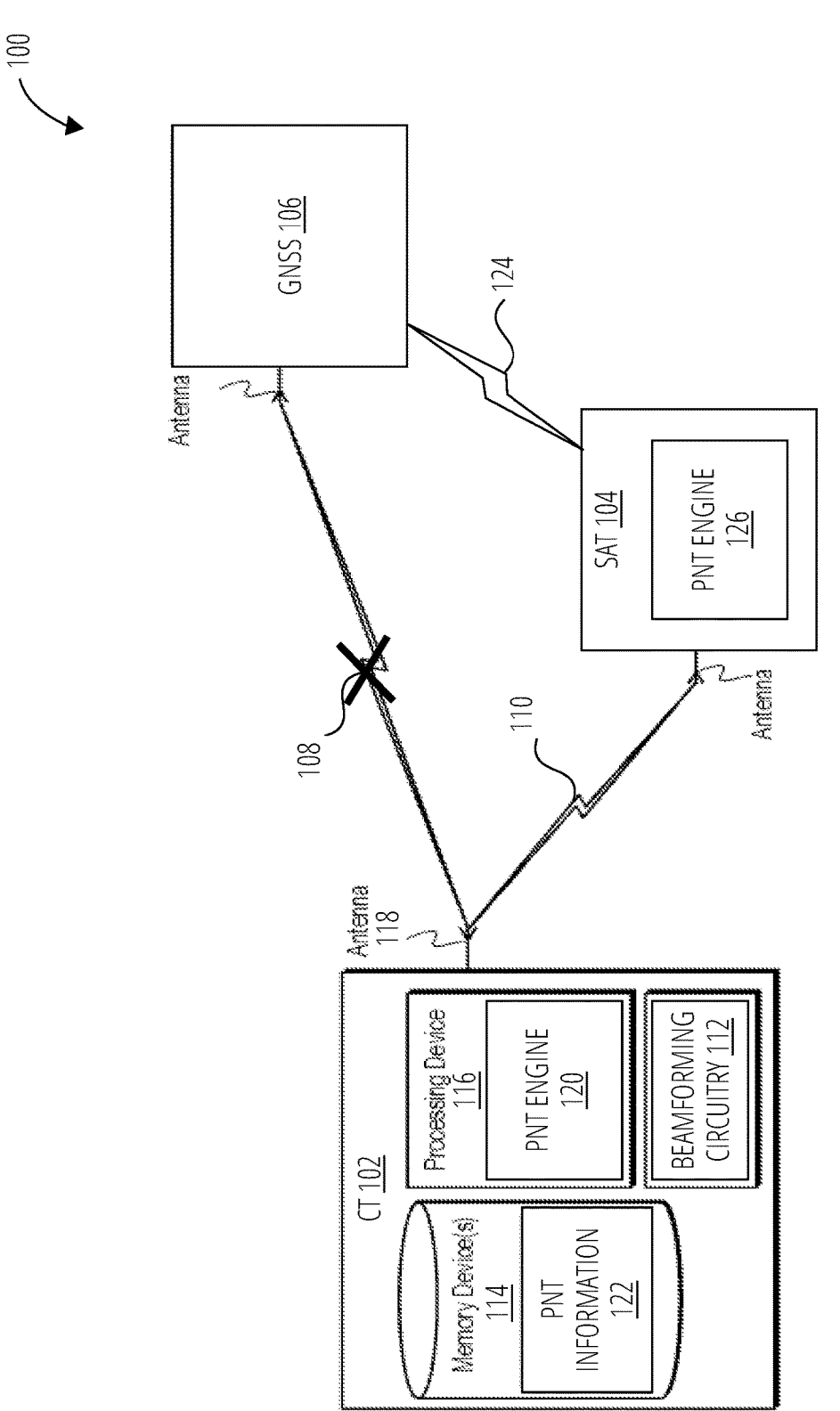
FIG. 1 is a block diagram of a satellite network including a customer terminal (CT) with a positioning, navigation, and timing (PNT) engine for maintaining connection with a satellite (SAT) during a GNSS outage according to at least one embodiment.

FIG. 1 is a block diagram of a satellite network 100 including a CT 102 with a PNT engine 120 for maintaining connection with a SAT 104 during a GNSS outage 108 according to at least one embodiment. The satellite network 100 can include multiple communication devices, including communication devices in CTs, SATs, etc. The CT 102 can be the UT 908 described below with respect to FIG. 9. The SAT 104 can be any one of the SAT 902*a*, 902*b*, . . . , etc., of FIG. 9. The communication devices in the satellite network 100 can receive PNT information from a GNSS 106. The SAT 104 can be an artificial satellite and may include one or more satellite communication elements (e.g., discussed further in FIG. 9 to FIG. 12). The SAT 104 can establish a communication link 124 with the GNSS 106. In at least one embodiment, the SAT 104 can include a processing device that implements a PNT engine 126. In at least one embodiment, the PNT engine 126 can include processing logic comprising hardware, software, firmware, or any combination thereof. The PNT engine 126 can continue to receive PNT information from GNSS 106 during the GNSS outage 108 experienced by the CT 102. The SAT 104 can be considered an anchor SAT that provides PNT information, instead of or in the event of the GNSS outage 108. The PNT engine 126 can use the PNT information to update a position and a velocity of the SAT 104. As described herein, the PNT engine 126 can share position and velocity information of the SAT 104 and/or position and velocity information with the CT 102. It should be noted that timing information with sufficient accuracy needs to be known before the communication link 110 is established between the CT 102 and SAT 104. The source of this initial timing information can be from GNSS 106 before the GNSS outage 108 or can be derived by other means during an initial network entry (INE) procedure. Once initial timing and position information is acquired and the communication link 110 is established, the CT 102 can use the SAT 104 as the timing and position truth source in the case of the GNSS outage 108.

In at least one embodiment, the CT 102 includes a processing device 116 that implements a PNT engine 120, beamforming circuitry 112, and one or more memory device(s) 114. The processing device 116 can be or include one or more CPUs, microcontrollers, field programmable gate arrays, or other types of processors. The beamforming circuitry 112 can be coupled to one or more antennas 118, such as a phased array antenna, to communicate with other devices. The CT 102 can include other circuitry for communicating wirelessly. For example, the CT 102 can include one or more RF chains. The RF chains can have low-noise amplifiers (LNAs), automatic gain controllers (AGCs), analog-to-digital converters (ADCs), digital beamforming (DBF) devices, etc., to transmit signals and/or process received signals (e.g., directs analog and digital beamforming components, converts the signal to a digital representation, and processing the digital information) to produce digital samples of the received signal. In some embodiments, a single antenna with multiple apertures may be used instead of two or more antennas. The RF chain(s) can be configured to direct receive beams to receive signals at various beamforming angles. Receive beams may be directed using a weighting pattern across beamforming elements and an antenna array. The weighting pattern may result in a sensitivity pattern due to signal interference. An antenna gain pattern may include a weighting pattern (or distribution of signal processing weights) that may include a combination of beamforming values, such as phase shifting values, signal amplifier values, etc., that are configured to steer a signal (e.g., main lobe, side lobes, signal minimum points, etc.) at different directions. An antenna gain pattern may include a main lobe, side lobes, and signal minimums spread across various directions relative to a bearing angle of an antenna array. In some embodiment, a bearing angle is defined as a direction normal to a plane of an antenna array (or, more generally, a portion and an array antenna). Further details regarding beamforming and beam steering are discussed in FIG. 12.

In at least one embodiment, the PNT engine 120 can include processing logic comprising hardware, software, firmware, or any combination thereof. The PNT engine 120 can receive PNT information from GNSS 106 in the absence of a GNSS outage. The PNT engine 120 can use the PNT information to update a position and a velocity of the CT 102. In at least one embodiment, The PNT engine 120 can receive, at a first time, first timing information from GNSS 106. The PNT engine 120 can update, using the first timing information, a first clock of the CT 102. In at least one embodiment, the PNT engine 120 can receive, at the first time, first PNT information from the GNSS 106. The PNT engine 120 can update, using the first PNT information, a first portion and a first velocity of the CT 102. As described herein, the CT 102 can establish the communication link 110 with the SAT 104 using position and velocity information of the CT 102 and position and velocity information of the SAT 104. The PNT engine 120 can determine the GNSS outage 108 after the first time. The CT 102 can establish the communication link 110 before the GNSS outage 108. The PNT engine 120 can determine, at a second time after the first time, second timing information representing a clock drift between the first clock of the CT 102 and a second clock of the SAT 104. The PNT engine 120 can derive the second timing information from messages exchanged between the SAT 104 and the CT 102 over the communication link 110. The message can be exchanged as part of a closed-loop clock tracking procedure, such as illustrated and described below with respect to FIG. 7. The PNT engine 120 can update, using the second timing information, the first clock of the CT 102. In this manner, the CT 102 can maintain the communication link 110 despite the GNSS outage 108. As described herein, the PNT engine 120 can enable mobile CTs to maintain communication in the satellite network 100 after the GNSS outage 108. In this context, the PNT engine 120 can replace the reference GNSS as the source of timing truth by timing references provided by the SATs of the satellite network 100. To achieve this purpose, the PNT engine 120 can create and use closed-loops between the CT 102 experiencing the GNSS outage 108 and the anchor SAT 104 through which timing quantities as measured by the anchor SAT 104 are conveyed to the CT 102 (e.g., a mobile CT) on a frequent basis. The PNT engine 120 can create and use closed-loops with one or more SATs in the satellite network 100. Given these timing quantities from the anchor SATs, the PNT engine 120 performs the corresponding periodic adjustments in the first clock to keep the first clock within system requirements.

In at least one embodiment, the PNT engine 120 can receive, at a first time, first timing information and first position information from the GNSS 106. A first clock of the CT 102 can be based on the first timing information and first position information. The PNT engine 120 can establish, using the first timing information and first position information, the communication link 110 with the SAT 104. The PNT engine 120 can receive from the SAT 104 second position information at a second time after the first time and first velocity information of the SAT 104 at the second time after the first time. The PNT engine 120 can determine, using the first timing information and first position information, third position information at the second time and second velocity information of the CT 102 at the second time. The PNT engine 120 can determine, using the second position information and the third position information, a slant range vector between the SAT 104 and the CT 102 at the second time, the slant range vector including a magnitude and a direction. The magnitude of the slant range vector represents a physical distance between the SAT 104 and the CT 102 and the direction of the slant range vector represents an angle between the SAT 104 and CT 102 in a Zenith axis. The PNT engine 120 can determine, using the magnitude of the slant range vector and a physical distance between the SAT 104 and the Earth, an azimuth direction from the beamforming circuitry of the CT 102 to the SAT 104. The PNT engine 120 maintains the communication link with the SAT using the azimuth direction. The PNT engine 120 can determine the GNSS outage 108 by determining that additional timing information and additional position information is not received from the GNSS 106 at a third time after the first time. The PNT engine 120 can receive second timing information and fourth position information from the SAT 104 over the communication link 110. The PNT engine 120 can update the first clock of the CT 102 using the second timing information and the fourth position information.

In a further embodiment, the PNT engine 120 can receive a first message from the SAT 104 over the communication link 110. The PNT engine 120 can send a second message to the SAT 104 over the communication link 110. The PNT engine 120 can receive the second timing information with a roundtrip time (RTT) that represents a difference between a first timestamp associated with the first message being sent by the SAT 104 and a second timestamp associated with the second message being received by the SAT 104. The PNT engine 120 can determine a carrier frequency offset (CFO) estimate using a downlink signal from the SAT 104. The PNT engine 120 can determine, using the CFO estimate and the RTT, (i) a radial velocity of the CT 102 in the direction of the slant range vector and (ii) a constant representing a clock drift between a second clock of the SAT and the first clock of the CT.

Furthermore, the PNT engine 120 can perform an update of its positions and velocity such that beamforming operations and handovers are also enabled during the GNSS outage 108. As described herein, the anchor SATs have their own timing truth that is assumed not to be impacted by the GNSS outage 108. The PNT engine 120 can maintain a connected state with the SAT 104 after a GNSS service provided by the GNSS 106 is lost by the CT 102. It can be assumed that the PNT engine 120 is in a connected state when the GNSS service is lost. In at least one embodiment, the PNT engine 120 can receive or generate PNT information 122. The CT 102 can perform functions using the processing device 116 to execute instructions provided by the memory device(s) 114. The PNT information 122 can include position information about the CT 102, position information about the SAT 104, velocity information about the CT 102, velocity information about the SAT 104, timing information received from GNSS 106, timing information received from the SAT 104, timing information generated by the PNT engine 120, or any combination thereof. The PNT engine 120 can store the PNT information 122 in the one or more memory device(s) 114, which may correspond to any combination of volatile and/or non-volatile storage mechanisms. The one or more memory device(s) 114 can store information that provides operating system components, various program modules, program data, and/or other components. In one embodiment, the memory device(s) 114 stores instructions of methods to control the operation of the CT 102 as described herein.

Although devices of the satellite network 100 are illustrated as having several separate functional elements, one or more of the functional elements may be combined and may be implemented by combinations of software-configured elements, such as processing elements, including digital signal processors (DSPs), and/or other hardware elements. For example, some elements may comprise one or more microprocessors, DSPs, application-specific integrated circuits (ASICs), radio-frequency integrated circuits (RFICs), and combinations of various hardware and logic circuitry for performing at least the functions described herein. In some embodiments, the functional elements of a device may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the CT 102 may include one or more processors and may be configured with instructions stored on a computer-readable storage device.

As described above, in order for the CT 102 to establish and maintain the communication link 110 with the SAT 104, the CT 102 can determine positional information of the CT 102 and the 104 as described below with respect to FIG. 2.

CT Motion Characterization

Figure 2:
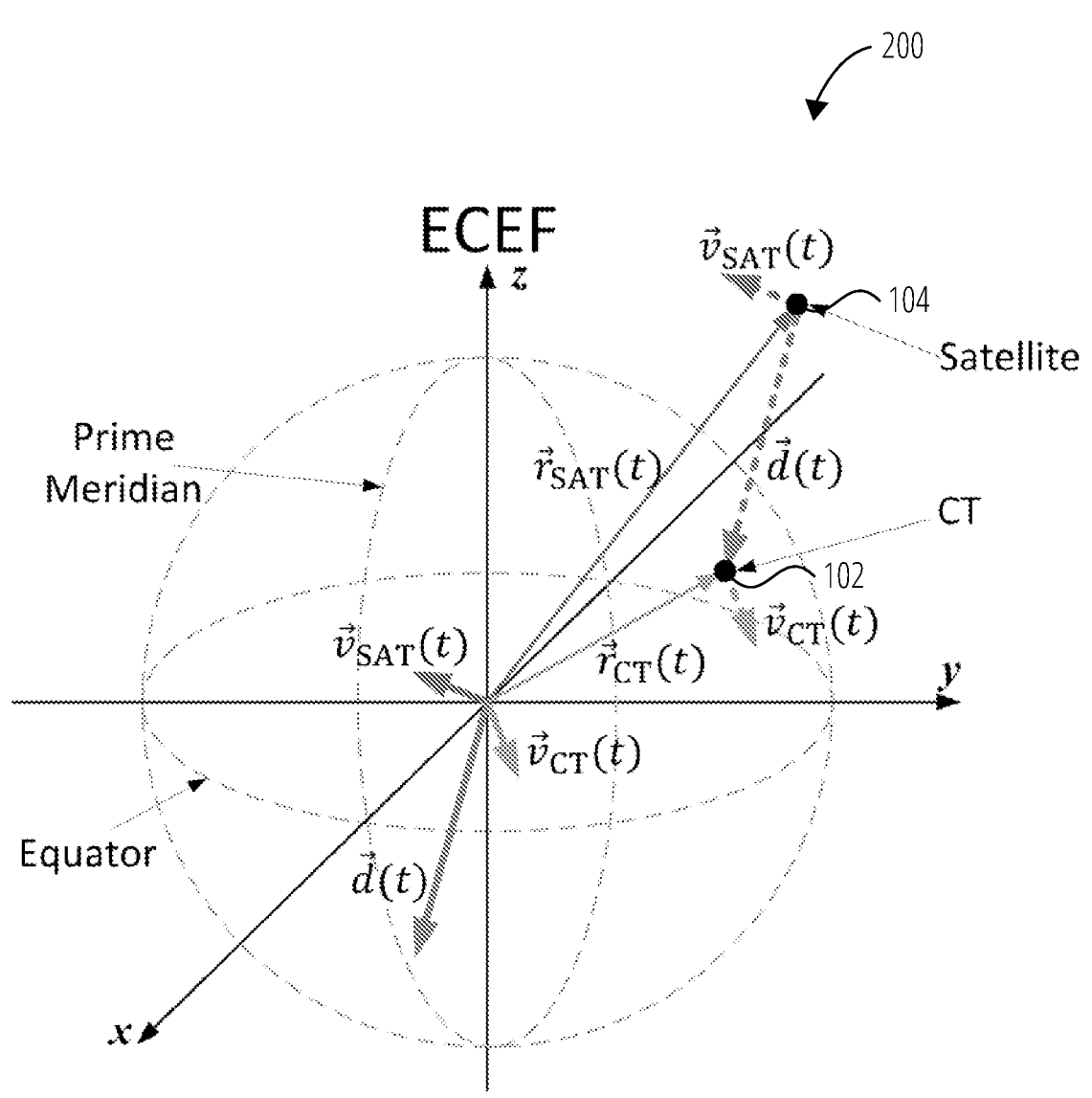
FIG. 2 illustrates a position of a CT and a position of a satellite in an earth-centered, earth-fixed (ECEF) reference frame according to at least one embodiment.

FIG. 2 illustrates a position of a CT 102 and a position of a satellite 104 in an ECEF reference frame 200 according to at least one embodiment. As described above, in order to maintain communication in the satellite network after a GNSS outage, the CT 102 performs updates on positions and velocities of the CT 102 and SAT 104 such that beamforming operations and handovers can be enabled during the GNSS outage 108. As described above, it is assumed that the SAT 104 can derive its own timing truth and position truth from the GNSS 106 over the communication link 124 even though the CT 102 is experiencing the GNSS outage 108. For the CT 102 to derive the timing truth and position truth from the SAT 104, the CT 102 is in a connected state with the SAT 104 when the GNSS is lost in the GNSS outage 108. The CT 102 needs to maintain the connected state by determining position and timing information derived from the SAT 104 as described in more detail below. The SAT 104 can derive its own timing truth and position truth from other sources of equivalent precision.

In at least one embodiment, the CT 102 can determine and maintain position information about the CT 102 and the SAT 104. In at least one embodiment, the CT 102 can receive position and velocity information of the SAT 104 from the SAT 104 over the communication link 110. In at least one embodiment, the CT 102 determines the following vector entities in the ECEF reference frame 200. The vector entities can be used for defining the kinematics relevant for maintaining a communication link between the CT 102 and the SAT 104. In at least one embodiment, the vector entities can be used for a closed-loop clock tracking procedure described in more detail below with respect to FIG. 7. The CT 102 can determine a first vector, $\vec{r}_{SAT}(t)$, representing a position of the SAT 104 over a series of times (t). The CT 102 can determine a second vector, $\vec{r}_{CT}(t)$, representing a position of the CT 102 at over the series of times (t). The CT 102 can determine a third vector, $\vec{d}(t) = \vec{r}_{SAT}(t) - \vec{r}_{CT}(t)$, representing a slant range between the SAT 104 and the CT 102 over the series of times (t). The slant range represents a physical distance between the SAT 104 and the CT 102. The CT 102 can determine a fourth vector, $\vec{v}_{SAT}(t)$, representing a velocity of the SAT 104 over the series of times (t). The CT 102 can determine a fifth vector, $\vec{v}_{CT}(t)$, representing a velocity of the CT 102 over the series of times (t). Assuming constant velocities of the SAT 104 and CT 102, the positions of the SAT 104 and the CT 102 at time instant, $t_i$, can be expressed as a function of $t_{i-1}$, respectively, as equations (1) and (2).

$$\vec{r}_{SAT}(t_i)=\vec{v}_{SAT}(t)\cdot(t_i-t_{i-1})+\vec{r}_{SAT}(t_{i-1}) \qquad (1)$$

$$\vec{r}_{CT}(t_i)=\vec{v}_{CT}(t)\cdot(t_i-t_{i-1})+\vec{r}_{CT}(t_{i-1}) \qquad (2)$$

In the above equations, the time indexes for the velocities $\vec{v}_{SAT}(t)$ and $\vec{v}_{CT}(t)$ were dropped based on the assumption that these are constant between $t_i$ and $t_{i-1}$. From the equations above, the third vector can be expressed as follows in equation (3);

$$\vec{d}(t_i)=(\vec{v}_{SAT}(t)-\vec{v}_{CT}(t))\cdot\Delta t+\vec{d}(t_{i-1}) \qquad (3),$$

where $\Delta t=t_i-t_{i-1}$. Furthermore, the squared norm (Euclidean Norm) of the slant range vector, $\vec{d}(t_i)$ can be expressed as follows in equation (4).

$$\|\vec{d}(t_i)\|^2=(\Delta t)^2\|(\vec{v}_{SAT}(t)-\vec{v}_{CT}(t))\|^2+2\Delta t((\vec{v}_{SAT}(t)-\vec{v}_{CT}(t))\cdot \vec{d}(t_{i-1})+\|d(t_{i-1})\|^2 \qquad (4)$$

The radial velocity in the direction of the vector $\vec{d}(t-1)$ can be defined in equation (5) as follows:

$$v_{radial}(t_{i-1})=\|\vec{v}_{SAT}(t)-\vec{v}_{CT}(t))\|\cos(\theta_{v,CT}(t_{i-1})) \qquad (5).$$

Figure 3:
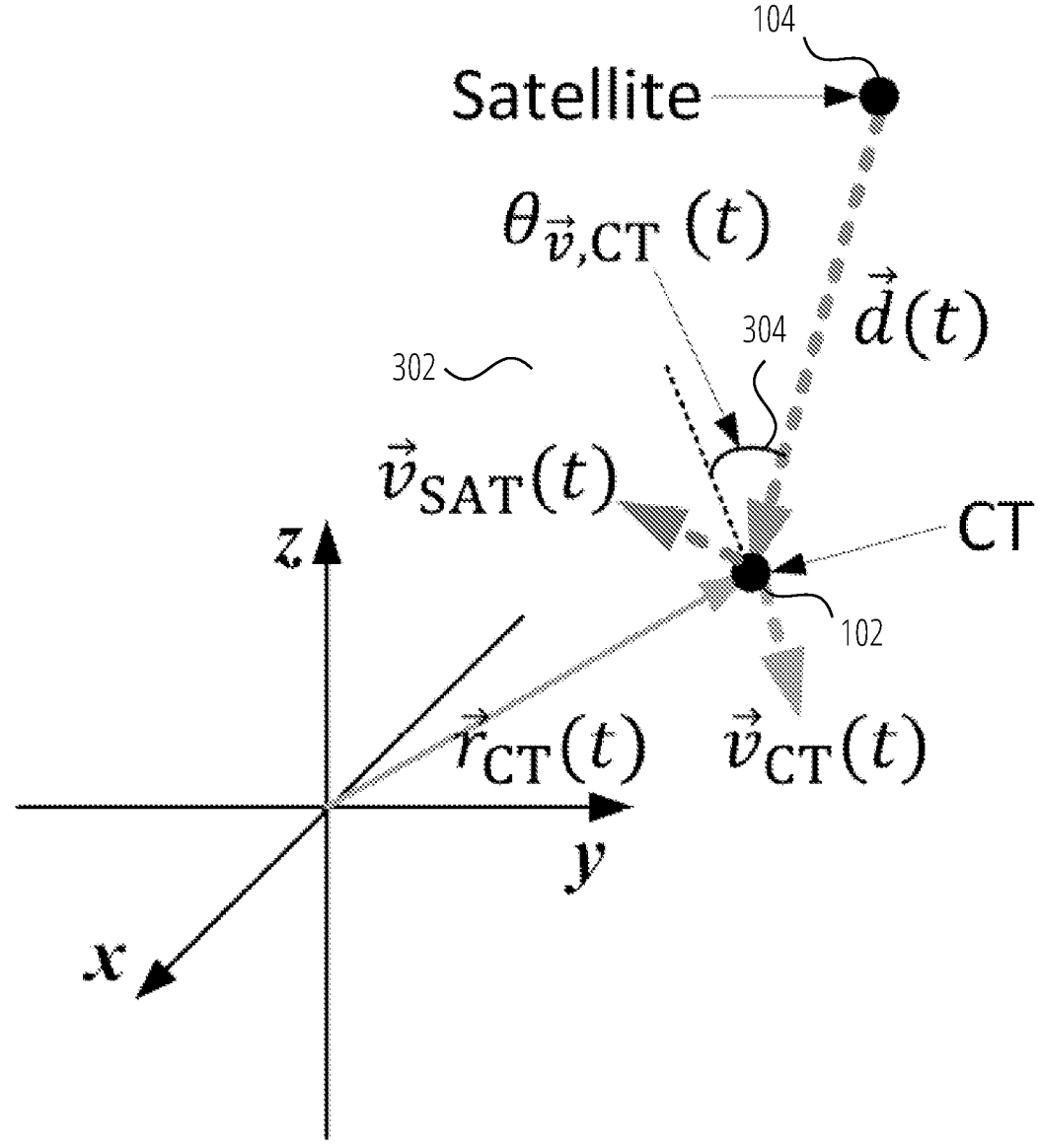
FIG. 3 illustrates a plane defined by velocities of the SAT and CT and passing through the position of the CT according to at least one embodiment.

From the CT perspective, the $\theta_{v,CT}(t_{i-1})$ in equation (5) is the elevation angle of the slant range, $\vec{d}(t-1)$, as seen from a plane defined by $\vec{v}_{SAT}(t)$ and $\vec{v}_{CT}(t)$ and passing through the CT at the position of the CT, $\vec{r}_{CT}(t_{i-1})$, as shown in FIG. 3.

By substituting $v_{radial}(t_{1-1})$ into the equation (4), the resulting equation (6) is as follows:

$$\|\vec{d}(t_i)\|^2=(\Delta t)^2\|(\vec{v}_{SAT}(t)-\vec{v}_{CT}(t))\|^2+2\Delta t\|\vec{d}(t_{i-1})\|v_{radial}(t_{i-1})+\|\vec{d}(t_{i-1})\|^2 \qquad (6)$$

FIG. 3 illustrates a plane 302 defined by velocities of the SAT and CT and passing through the position of the CT according to at least one embodiment. As described above, from the CT perspective, the $\theta_{v,CT}(t_{i-1})$ in equation (5) is the elevation angle 304 of the slant range, $\vec{d}(t-1)$, as seen from the plane 302 defined by the velocity of the SAT 104, $\vec{v}_{SAT}(t)$ and the velocity of the CT 102, $\vec{v}_{CT}(t)$, and passing through the CT 102 at the position of the CT, $\vec{r}_{CT}(t_{i-1})$.

The equation (4) of the squared norm of the slant range vector, $\hat{d}(t_i)$ can be modified to only involve scalar quantifies as expressed in the following equation (7).

$$\left\|\vec{d}(t_i)\right\|^2=\left(\frac{\Delta t\cdot v_{radial}(t_{i-1})}{\cos(\theta_{v,CT}(t_{i-1}))}\right)^2+2\Delta t\left\|\vec{d}(t_{i-1})\right\|v_{radial}(t_{i-1})+\left\|\vec{d}(t_{i-1})\right\|^2 \qquad (7)$$

It should be noted that the velocity of the SAT 104, $\vec{v}_{SAT}(t)$, is tangential to the SAT's orbit and is assumed to be known by the SAT 104. For terrestrial CTs, the velocity of the CT 102, $v_{CT}(t)$, can be reasonably assumed to be tangential to the Earth's surface. Given these assumptions, for terrestrial CTs, the elevation angle 304, $\theta_{v,CT}(t_{i-1})$ equals the SAT elevation angle with respect to the Earth's surface at the position of the CT 102, $\vec{r}_{CT}(t_{i-1})$ The position vector, $\vec{r}_{SAT}(t_{i-1})$, can be assumed to be known by the SAT 104.

Thus, the position of the CT 102, $\vec{r}_{CT}(t_{i-1})$, can be determined using the equation (8) as follows.

$$\vec{r}_{CT}(t_{i-1})=\vec{r}_{SAT}(t_{i-1})-\vec{d}(t_{i-1}) \qquad (8)$$

The position of the CT 102, $\vec{r}_{CT}(t_{i-1})$, can be determined and used in a determination of the elevation angle 304. For non-terrestrial CTs, the direction of the velocity of the CT 102, $\vec{v}_{CT}(t_{i-1})$, can be determined using data from one or more inertial measurement units (IMUs) of the CT 102.

It should be noted that the equations above can be used to determine a magnitude of the slant range, $\vec{d}(t_i)$. In determining the position vector of the CT 102, $\vec{r}_{CT}(t_{i-1})$, a direction of the slant range, d'ta, needs to be determined. In at least one embodiment, the CT 102 determines the direction of the slant range, $\vec{d}(t_i)$ as described in more detail below with respect to FIG. 4, FIG. 5, and FIG. 6.

Figure 4:
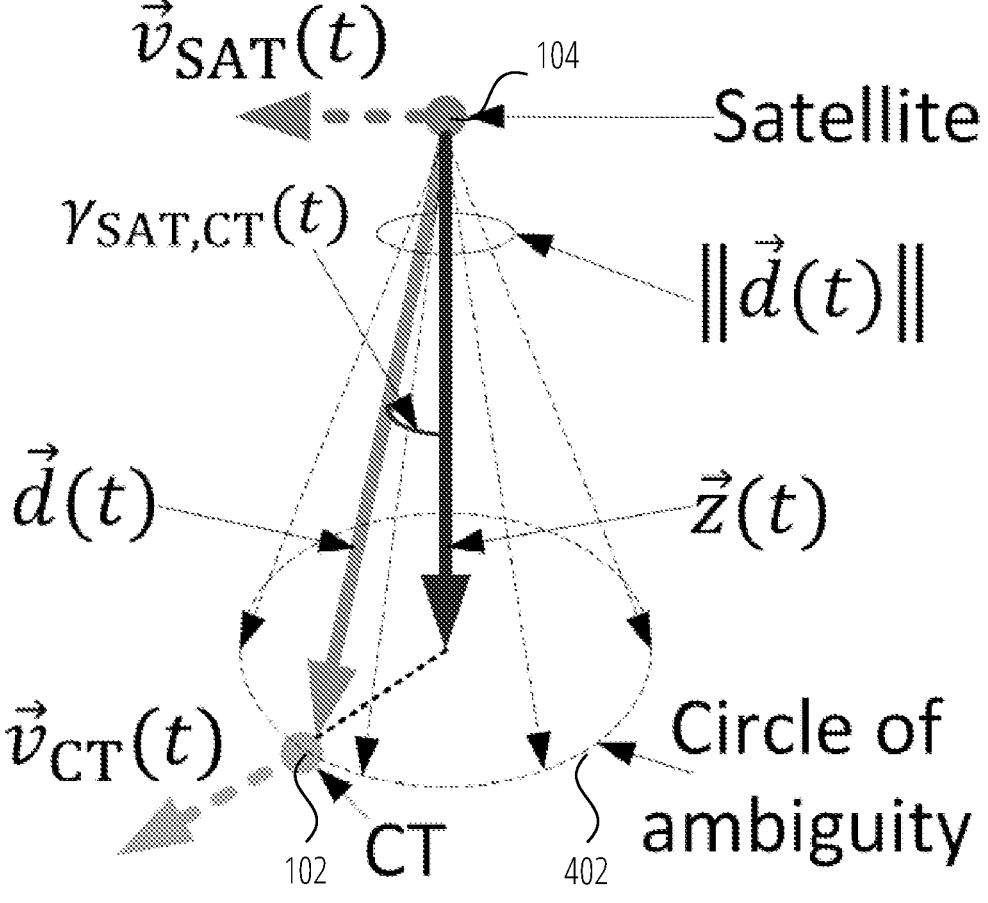
FIG. 4 illustrates a circle of ambiguity of possible positions of a CT given a magnitude of a slant range relative to a SAT without a direction of the slant range according to at least one embodiment.

FIG. 4 illustrates a circle of ambiguity 402 of possible positions of the CT 102 given a magnitude of a slant range relative to the SAT 104 without a direction of the slant range according to at least one embodiment. As described above, the equations above provide updates for the magnitude of the slant range, $\|\vec{d}(t)\|$. Using geometry as depicted in FIG. 4, the magnitude of the slant range defines the circle of ambiguity 402 without direction information of the slant range. The circle of ambiguity 402 is a set of possible locations of the CT on a circle, all of which are located the same distance from the SAT 104, the distance being equal to the magnitude of the slant range. That is, the CT 102 can be located anywhere on this circle at the time instant.

Figure 5:
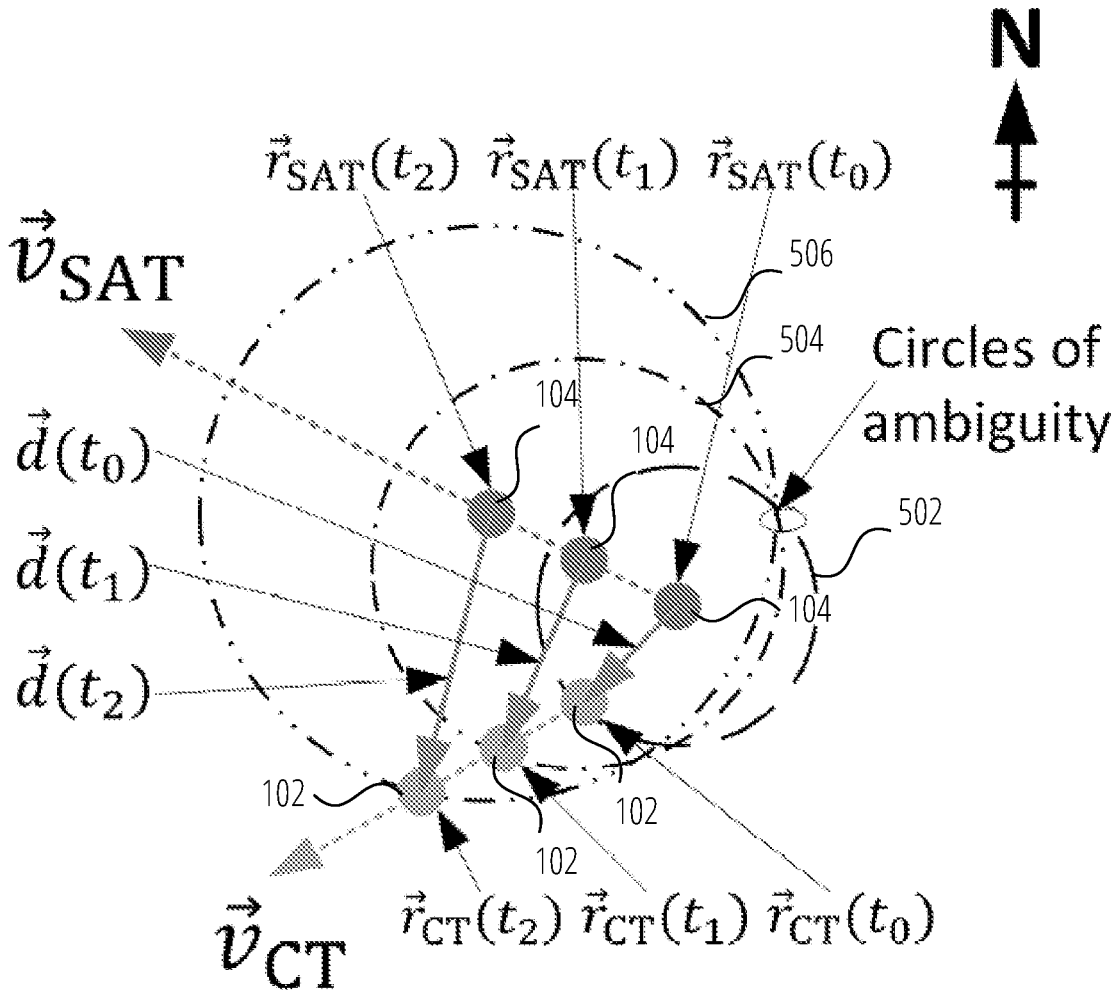
FIG. 5 illustrates a progression in time of the positions of the SAT and the corresponding circles of ambiguity according to at least one embodiment.

FIG. 5 illustrates a progression in time of the positions of the SAT and the corresponding circles of ambiguity 502, 504, 506, according to at least one embodiment. The first circle of ambiguity 502 is at a first time, the second circle of ambiguity 504 is at a second time after the first time, and the third circle of ambiguity 506 is at a third time after the second time. As illustrated in FIG. 4 and FIG. 5, if the SAT 104 and CT 102 are to stay connected, the CT's antenna must be beamforming in an azimuth direction that passes through the SAT 104. In at least one embodiment, auto-trim procedures can be used to keep the beam pointing at the SAT 104 with acceptable accuracy. In at least one embodiment, tracking procedures can be used to determine an azimuth angle (or azimuth direction) of the slant range to maintain a communication link between the SAT 104 and the CT 102. The CT 102 can know the Truth North, and the True North can be used as a reference for the azimuth direction, $\varphi_{CT,SAT}(t_i)$, of the slant range, $\vec{d}(t)$, as illustrated in FIG. 6.

Figure 6:
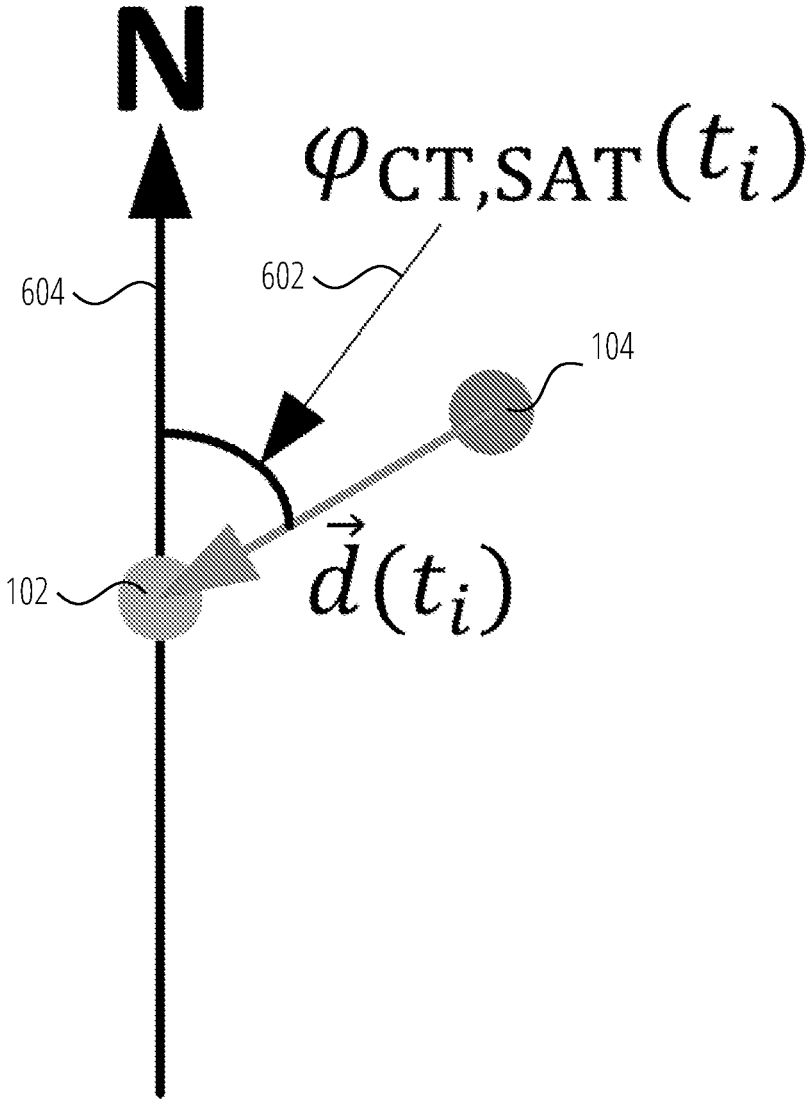
FIG. 6 illustrates an azimuth direction of a slant range using True North as a reference according to at least one embodiment.

FIG. 6 illustrates an azimuth direction 602 of a slant range using True North 604 as a reference according to at least one embodiment. The azimuth direction 602 can be used for beamforming by the CT 102 to establish or maintain a communication link with the SAT 104 at a specified time, using True North 604 as a reference.

A vector, $\vec{z}(t)$, can be defined for a physical distance between the SAT 104 and the Earth in a Zenith direction (Zenith axis), as illustrated in FIG. 4. The vector, $\vec{z}(t)$, is typically known by the SAT 104 and an angle, $\gamma_{SAT,CT}(t)$, between the vector, $\vec{z}(t)$, and the slant range vector, $\vec{d}(t)$ is given by the following equation (9).

$$\gamma_{SAT,CT}(t) = \arccos\left(\frac{\|\vec{z}(t)\|}{\|\vec{d}(t)\|}\right) \tag{9}$$

Using the azimuth direction, $\varphi_{CT,SAT}(t_i)$ and angle, $\gamma_{SAT,CT}(t)$, the following equation (10) can be established.

$$d(t) = \|d(t)\| \cdot \begin{bmatrix} \sin(\gamma_{SAT,CT}(t))\cos(\varphi_{CT,SAT}(t_i)) \\ \sin(\gamma_{SAT,CT}(t))\sin(\varphi_{CT,SAT}(t_i)) \\ \cos(\gamma_{SAT,CT}(t)) \end{bmatrix}, \tag{10}$$

where $\varphi_{SAT,CT}(t_i) = \varphi_{CT,SAT}(t_i) + 180°$ using True North 604 as reference.

As shown in FIG. 4, a reasonable approximation for the elevation angle 304, $\theta_{v,CT}(t_{i-1})$, for terrestrial CTs is given by the following equation (11).

$$\theta_{v,CT}(t_{i-1}) = \arcsin\left(\frac{\|\vec{z}(t)\|}{\|\vec{d}(t)\|}\right) \tag{11}$$

Or the elevation angle 304 can be expressed as follows in equation (12).

$$\theta_{v,CT}(t_{i-1}) = 90° - \gamma_{SAT,CT}(t) \tag{12}$$

As described above, once the positional information is used to establish and maintain the communication link between CT 102 and SAT 104, the CT 102 can perform closed-loop clock drift tracking to update a clock of the CT 102, as described below with respect to FIG. 7.

Closed-Loop Clock Drift Tracking

As described above, the CT 102 can use a closed-loop clock tracking procedure to characterize a CT clock drift over time. To characterize the CT clock drift over time, the CT 102 and SAT 104 can exchange messages, such as illustrated in a call flow diagram of FIG. 7.

Figure 7:
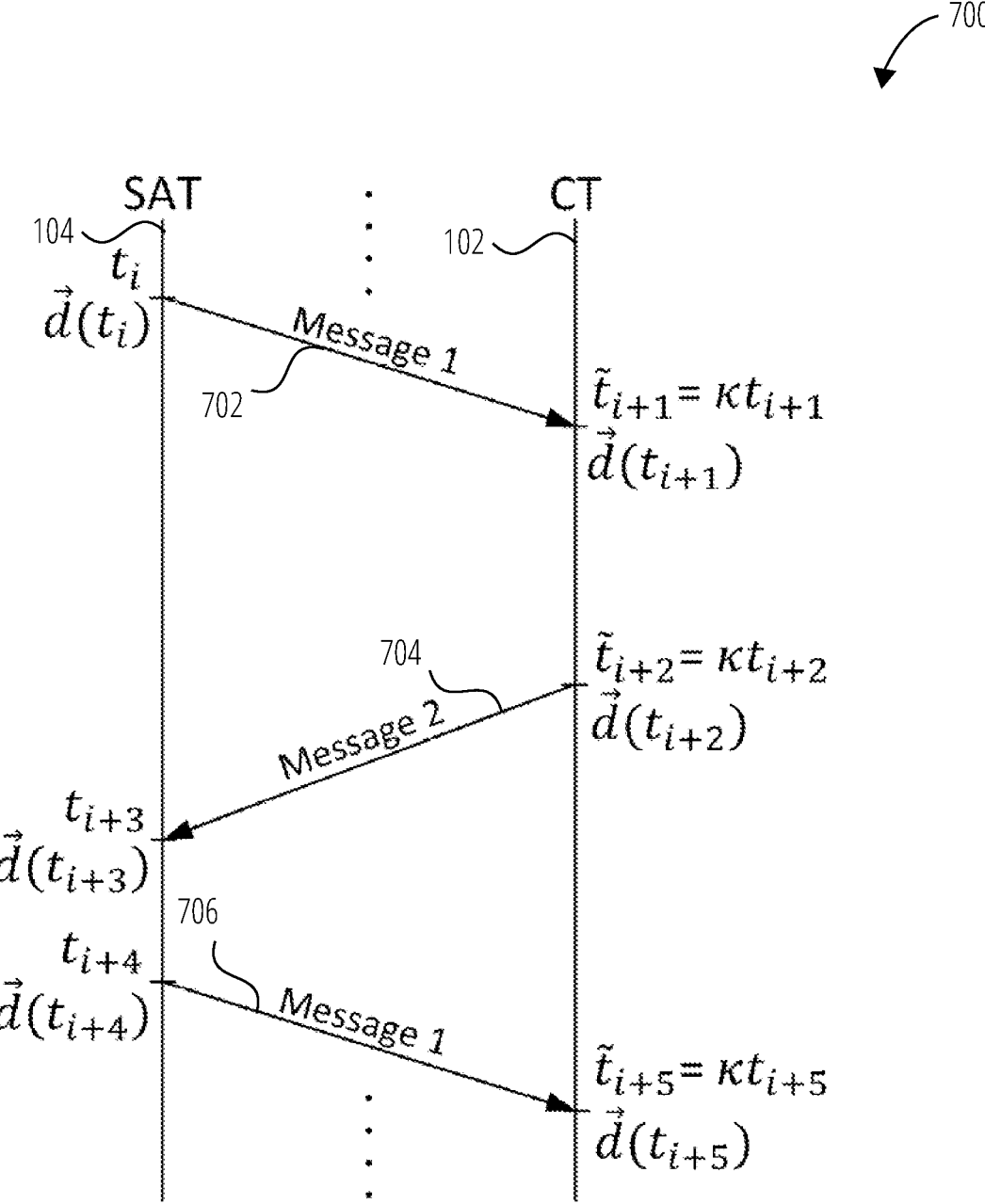
FIG. 7 is a flow diagram illustrating messages exchanged between the SAT and the CT over the communication link for closed-loop clock drift tracking according to at least one embodiment.

FIG. 7 is a flow diagram 700 illustrating messages exchanged between the SAT and the CT over the communication link for closed-loop clock drift tracking according to at least one embodiment. In this diagram, the SAT 104 is the source of timing truth, while the CT 102 is experiencing a GNSS outage. The CT 102 has a version of the time related to a true time by a constant, as expressed in equation (13) as follows.

$$\tilde{t}_i = \kappa \cdot t_i \tag{13},$$

where $t_i$ represents the true time measured by the SAT 104 and $t_i$ represents the corresponding time measured by the CT clock. The constant represents a clock drift between a first clock of the CT 102 and a second clock of the SAT 104.

As a corollary, if the SAT and CT times are related by the constant, $\kappa$, their carrier frequencies are related as expressed in equation (14).

$$\tilde{f}_c = \frac{f_c}{\kappa} \tag{14}$$

where $f_c$ is the true carrier frequency synthesized at the SAT 104 with a GNSS-disciplined oscillator and $\tilde{f}_c$ is the carrier frequency synthesized at the CT 102 in the GNSS outage.

For the closed-loop clock drift tracking, the CT 102 receives a first message 702 from the SAT 104 over a communication link. The CT 102 sends a second message 704 to the SAT 104 over the communication link. The CT 102 can receive timing information from the SAT 104. The timing information can include a roundtrip time (RTT) that represents a difference between a first timestamp associated with the first message 702 being sent by the SAT 104 and a third timestamp associated with the second message 704 being received by the SAT 104. The roundtrip time (RTT) can be defined as follows in equations (15) and (16).

$$RTT = t_{i+3} - t_i \tag{15}$$

$$RTT = \frac{\|\vec{d}(t_{i+1})\|}{c_0} + (t_{i+1} - t_{i+1}) + \frac{\|\vec{d}(t_{i+1})\|}{c_0}, \tag{16}$$

where $c_0$ is the speed of light. Assuming that the exchanges of first message 702 and second message 704 are carried out fast enough such that the CT position variation is negligible between a first time corresponding to the first timestamp, $t_i$, and a fourth time corresponding to a fourth timestamp, $t_{i+3}$, the radial velocity, $v_{radial}(t_i)$, and the elevation angle 304, $\theta_{v,CT}(t_{i-1})$, can be used as references for the computation of the slant angle magnitudes at a second time corresponding to a second timestamp, $t_{i+1}$ and the fourth time corresponding to the fourth timestamp, $t_{i+3}$ as follows in equations (17) and (18), respectively.

$$\|\vec{d}(t_{i+1})\|^2 = \left(\frac{RTT \cdot v_{radial}(t_i)}{\cos(\theta_{v,CT}(t_i))}\right)^2 + 2(t_{i+1} - t_i)\|\vec{d}(t_i)\|v_{radial}(t_i) + \|\vec{d}(t_i)\|^2 \tag{17}$$

$$\|\vec{d}(t_{i+3})\|^2 = \left(\frac{RTT \cdot v_{radial}(t_i)}{\cos(\theta_{v,CT}(t_i))}\right)^2 + 2RTT\|\vec{d}(t_i)\|v_{radial}(t_i) + \|\vec{d}(t_i)\|^2 \tag{18}$$

The equation (17) and (18) above are written using the true time from the SAT 104. However, the true time information is unavailable for the second time, $t_{i+1}$ (corresponding to a second timestamp) and the third time, $t_{i+2}$ (corresponding to a third timestamp) because the CT measures them in the GNSS outage. The second time is associated with the first message 702 being received at the CT 102 and the third time is associated with the second message 704 being sent by the CT 102. Therefore, the equations (17) and (18) can be modified as equations (19) and (20) below.

$$RTT = \frac{\|\vec{d}(t_{i+1})\|^2 + \|\vec{d}(t_{i+3})\|^2}{c_0} + \frac{\tilde{t}_{i+2} - \tilde{t}_{i+1}}{\kappa} \tag{19}$$

$$\|\vec{d}(t_{i+1})\|^2 = \tag{20}$$

$$\frac{\left(\left(\frac{\tilde{t}_{i+1} - \tilde{t}_i}{\kappa}\right) \cdot v_{radial}(t_i)\right)^2}{\cos(\theta_{v,CT}(t_i))} + 2\left(\frac{\tilde{t}_{i+1} - \tilde{t}_i}{\kappa}\right)\|\vec{d}(t_i)\|v_{radial}(t_i) + \|\vec{d}(t_i)\|^2$$

It should be noted that the slant range at the fourth time, $\|\vec{d}(t_{i+3})\|$, is left unchanged because it is a function of the true times $t_i$ and $t_{i+3}$, which are provided by the SAT 104 to the CT 102. The elevation angle 304, $\theta_{v,CT}(t_i)$, can be derived from position vectors maintained by the CT 102 or provided by the SAT 104.

In at least one embodiment, a measurement of the radial velocity, $v_{radial}(t_i)$, can be determined by the CT 102 using carrier frequency offset (CFO) estimates. In at least one embodiment, the CT 102 determines a CFO estimate using a downlink signal with a carrier frequency from the SAT 104. In at least one embodiment, the CFO estimate is a difference between a carrier frequency of a received signal with a Doppler shift and a carrier frequency synthesized by the CT 102, as expressed in the following equation (21).

$$\Delta f(t_{i+1}) = f_{c,DL} \cdot \left(1 - \frac{v_{radial}(t_i)}{c_0}\right) - \frac{f_{c,DL}}{\kappa} \qquad (21)$$

The CFO estimate can also be expressed in equation (22).

$$\Delta f(t_{i+1}) = f_{c,DL} \cdot \left(1 - \frac{v_{radial}(t_i)}{c_0} - \frac{1}{\kappa}\right) \qquad (22)$$

With the true RTT being provided by the SAT 104 to the CT 102 and the frequency offset being measured by the CT 102, the CT 102 can determine the radial velocity, $v_{radial}(t_i)$, and the constant, $\kappa$. Using the equations above for the RTT and the CFO estimate, there are now two equations and two unknowns. In this context, once the radial velocity, $v_{radial}(t_{i+1})$, is determined, the slant range at a fifth time, $\vec{d}(t_{i+4})$ (corresponding to a fifth timestamp, $t_{i+4}$) can be estimated using an estimate for the elevation angle 304 at the fifth time, $\theta_{v,CT}(t_{i+4})$, such that a radial velocity, $v_{radial}(t_{i+5})$ and a new estimate for the constant, K, can be determined as described above. This process can continue as long as the CT 102 is in the GNSS outage.

In at least one embodiment, the CT 102 determines, using the CFO estimate and the RTT, (i) a radial velocity of the CT in the direction of the slant range and (ii) a constant, k, representing a clock drift between a second clock of the SAT and the first clock of the CT. Additional details of updating a clock of a CT in a GNSS outage are described below with respect to FIG. 8A and FIG. 8B.

Updating a Clock of a CT in a GNSS Outage

FIG. 8A is a flow diagram of a method 800 for updating a clock of a CT in a GNSS outage according to at least one embodiment. Method 800 may be performed by processing elements or processing logic that may comprise hardware (circuitry, dedicated logic, etc.), software (such as executing on a general-purpose computer system or a dedicated machine), or any combination thereof. In one embodiment, method 800 is performed on a communication device of a customer terminal (CT), such as CT 102 of FIG. 1. In another implementation, the method 800 is performed by PNT engine 120 of FIG. 1. In one embodiment, one or more blocks of FIG. 8A are performed by a processing device of the CT 102, while in some other implementations, one or more blocks of FIG. 8A may be performed by one or more other machines not depicted in the figures.

Referring to FIG. 8A, the method 800 begins with the processing logic establishing a communication link with a satellite (SAT) using position and velocity information of the CT (block 802). The processing logic can establish the communication link using the position and velocity information of the CT, position and velocity information of the SAT, and timing information. As described herein, the CT can receive PNT information from a GNSS. The CT can use the PNT information to establish the communication with the SAT. The processing logic can periodically determine and store the position and velocity information of the CT and SAT using vectors as described herein. At block 804, the processing logic receives at a first time, first timing information from a global navigation satellite system (GNSS). At block 806, the processing logic updates, using the first timing information, a first clock of the CT. At block 808, the processing logic determines an outage of the GNSS after the first time. At block 810, the processing logic determines, at a second time after the first time, second timing information representing a clock drift between the first clock of the CT and a second clock of the SAT. The second timing information is derived from messages exchanged between the SAT and the CT prior to the second time. At block 812, the processing logic updates, using the second timing information, the first clock of the CT.

In a further embodiment, the processing logic determines the outage of the GNSS by determining that third timing information is not received from the GNSS at a third time after the first time. The third time is before the second time.

In a further embodiment, the processing logic receives PNT information from the GNSS and use the PNT information to establish the communication link with the SAT.

In a further embodiment, the processing logic maintains the communication link by receiving, before the second time, first position information and first velocity information of the SAT from the SAT. In another embodiment, the processing logic determines a current position of the CT using prior position information of the CT and second velocity information of the CT in an ECEF reference frame. In another embodiment, the processing logic receives, before the second time, first position information of the SAT from the SAT. For example, processing logic on the SAT can be used to determine its position in the ECEF reference frame and send it to the CT. The processing logic determines current position information of the CT in the ECEF reference frame using prior position information of the CT and second velocity information of the CT. The processing logic determines, using the first position information and the current position information, (i) a direction from the CT to the SAT and (ii) a first physical distance between the CT and the SAT. The processing logic determines, using the first physical distance and a second physical distance between the SAT and the Earth, an azimuth direction from beamforming circuitry of the CT to the SAT. The communication link is maintained using the azimuth direction.

In at least one embodiment, the processing logic receives, from the SAT, position and timing information of a second SAT (e.g., in connection with a handoff procedure). The processing logic can establish, using the position and timing information of the second SAT, a second communication link with the second SAT.

In a further embodiment, to determine the second timing information prior to the second time, the processing logic receives a first message from the SAT over the communication link and sends a second message to the SAT over the communication link. The processing logic receives a RTT that represents a difference between a first timestamp associated with the first message being sent by the SAT and a second timestamp associated with the second message being received by the SAT. The processing logic determines a CFO estimate using a downlink signal from the SAT. The processing logic determines, using the CFO estimate and the RTT, (i) a radial velocity of the CT in a direction between the CT and the SAT and (ii) a constant representing the clock drift between the first clock of the CT and the second clock of the SAT.

In a further embodiment, the processing logic determines first position information of the CT at a third time using first velocity information of the CT at the third time and second position information of the CT at a fourth time before the third time. The processing logic determines third position information of the SAT at the third time using second velocity information of the SAT at the third time and fourth position information of the SAT at the fourth time. The processing logic determines, using (i) a difference in the second velocity information and the first velocity information, (ii) a difference in time between the third time and the fourth time, (iii) a first direction from the CT and the SAT at the third time, and (iv) a first physical distance between the CT and the SAT at the third time, a second physical distance between the CT and the SAT at the fourth time. The processing logic determines a second direction from the CT and the SAT at the fourth time, the second direction representing an azimuth direction from beamforming circuitry of the CT to the SAT. The communication link is maintained using the azimuth direction.

In a further embodiment, to determine the second direction, the processing logic determines a third physical distance between the SAT and the Earth in a Zenith axis. The processing logic determines, using (i) the second physical distance and (ii) the third physical distance, an angle between the SAT and the Zenith axis. The processing logic determines, using the angle between the SAT and the Zenith axis, the second direction.

In another embodiment, the processing logic determines the second timing information by receiving a RTT that represents a difference between a first timestamp associated with a first message being sent by the SAT and a second timestamp associated with a second message being received by the SAT. The processing logic determines a CFO estimate using a downlink signal from the SAT. The processing logic determines, using the CFO estimate and the RTT, (i) a radial velocity of the CT in the second direction and (ii) a constant representing the clock drift between the first clock of the CT and the second clock of the SAT.

In a further embodiment, the processing logic, to determine the second timing information, receives receiving a signal from the SAT. The processing logic determines a first carrier frequency of the signal. The processing logic determines, using a Doppler shift, a second carrier frequency of the signal. The processing logic determines, using the first carrier frequency and the second carrier frequency, a CFO estimate. The processing logic receives a RTT from the SAT. The processing logic determines, using the CFO estimate and the RTT, the clock drift.

In another embodiment, the processing logic determines, at a first time, a position of a satellite (SAT) in an ECEF reference frame using a prior position of the SAT and a velocity of the SAT. The processing logic determines, at the first time, a position of the CT in the ECEF reference frame using a prior position of the CT and a velocity of the CT. The processing logic determines, using the position of the SAT and the position of the CT, (i) a magnitude of a vector between the SAT and the CT and (ii) a direction of the vector, the magnitude representing a physical distance between the SAT and the CT. The processing logic determines, using the magnitude and a physical distance between the SAT and the Earth, an azimuth direction from the beamforming circuitry of the CT to the SAT. The processing logic maintains a communication link with the SAT using the azimuth direction. The processing logic receives first timing information from a GNSS. A first clock of the CT is based on the first timing information. The processing logic determines an outage of the GNSS. The processing logic receives second timing information from the SAT over the communication link. The processing logic updates the first clock of the CT using the second timing information.

In a further embodiment, the processing logic receives a first message from the SAT over the communication link and sends a second message to the SAT over the communication link. The processing logic receives the second timing information with a RTT that represents a difference between a first timestamp associated with the first message being sent by the SAT and a second timestamp associated with the second message being received by the SAT. The processing logic determines a CFO estimate using a downlink signal with a carrier frequency from the SAT. The processing logic determines, using the CFO estimate and the RTT, (i) a radial velocity of the CT in the direction of the slant range and (ii) a constant representing a clock drift between a second clock of the SAT and the first clock of the CT.

FIG. 8B is a flow diagram of a method 836 for maintaining a communication link with a SAT in a GNSS outage according to at least one embodiment. Method 836 may be performed by processing elements or processing logic that may comprise hardware (circuitry, dedicated logic, etc.), software (such as executing on a general-purpose computer system or a dedicated machine), or any combination thereof. In one embodiment, method 836 is performed on a communication device of a CT, such as CT 102 of FIG. 1. In another implementation, the method 836 is performed by PNT engine 120 of FIG. 1. In one embodiment, one or more blocks of FIG. 8B are performed by a processing device of the CT 102, while in some other implementations, one or more blocks of FIG. 8B may be performed by one or more other machines not depicted in the figures.

Referring to FIG. 8B, the method 836 includes the following operations: 1) CT receives or predicts position, velocity and zenith vector from SAT (block 814); 2) CT receives RTT measurement from CT (block 816); 3) CT estimates CFO using waveform received from SAT (block 818); 4) CT determines \theta and \gamma according to eqs. (9) and (11) and using a previously updated ||d|| (block 820); 5) Using a previously updated ||d||, the latest RTT measurement, the latest computed \theta and the latest computed CFO, build a system of two equations to determine v_radial and the clock drift \kappa (block 822); 6) Adjust the CT clock to mitigate its drift using \kappa (block 824); 7) Update ||d(t_{i+4})|| using the latest, v_radial, \kappa, \theta using eq. (18). Instead of RTT, use RTT+\Delta t, with \Delta t=t_{i+4}−t_{i+3}. Note \Delta t is also provided by the SAT to the CT (block 826); 8) Compute the vector d(t_{i+4}) using the latest available \gamma and \phi according to equation (10) (block 828); 9) Using the latest available r_SAT and d(t_{i+4}), compute r_CT using equation (8) (block 830); 10) Using the previously available r_CT and the newly updated r_CT, compute the velocity vector v_CT (block 832); and 11) Repeat the process above as long as GNSS outage (block 834).

Figure 9:
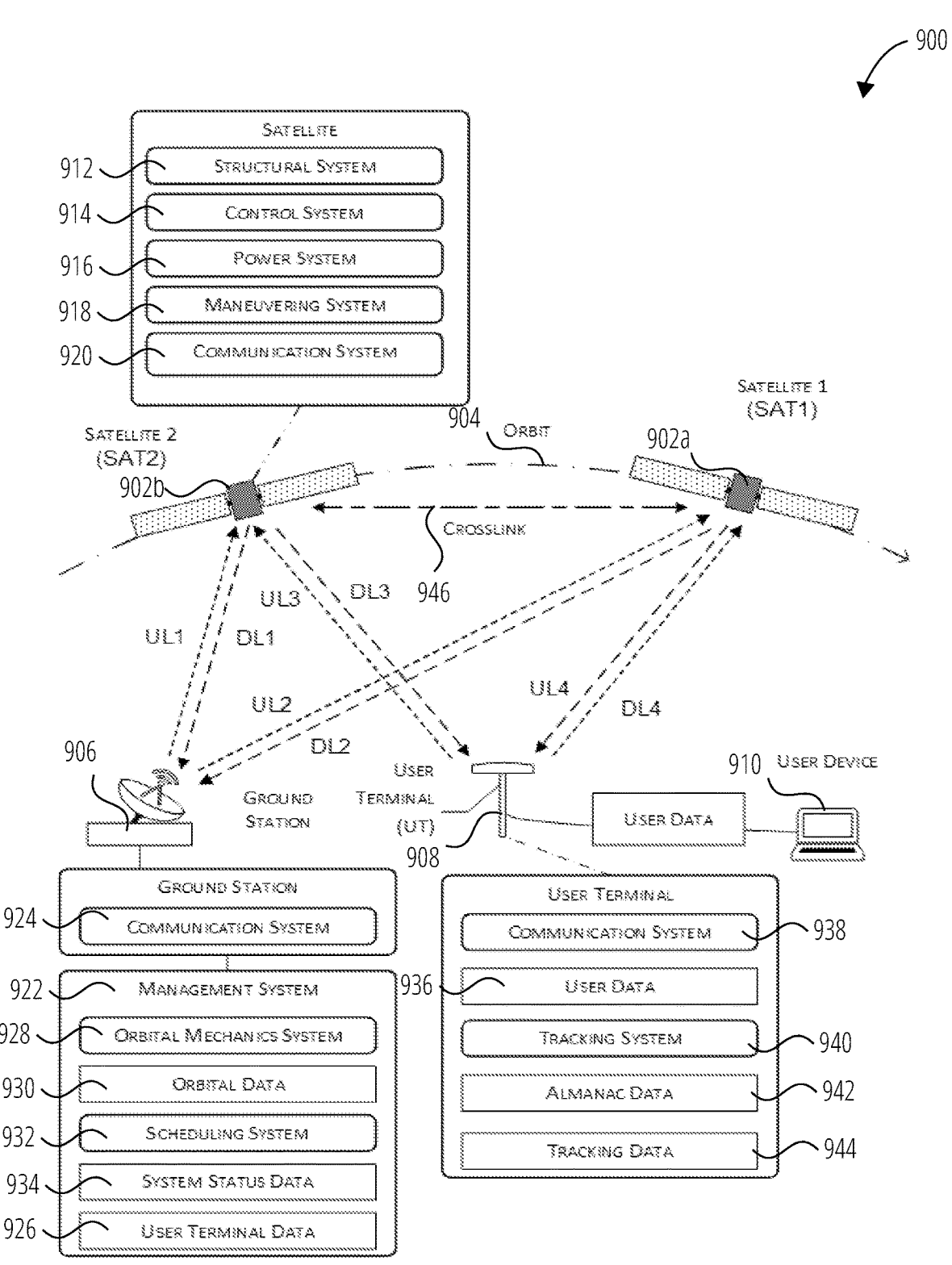
FIG. 9 illustrates a portion of a communication system that includes two satellites of a constellation of satellites, each satellite being in orbit, according to embodiments of the present disclosure.

FIG. 9 illustrates a portion of a communication system 900 that includes two satellites of a constellation of satellites 902a, 902b, . . . , etc., each satellite 902 being in orbit 904 according to embodiments of the present disclosure. The communication system 900 shown here comprises a plurality (or "constellation") of satellites 902a, 902b, . . . , etc., each satellite 902 being in orbit 904 as part of a satellite network, such as satellite network 100 of FIG. 1. Also shown is a ground station 906, a user terminal (UT) 908 (also referred to herein as customer terminal (CT)), and a user device 910.

The constellation may comprise hundreds or thousands of satellites 902, in various orbits 904. For example, one or more of these satellites 902 may be in non-geosynchronous orbits (NGOs) in which they are in constant motion with respect to the Earth. For example, the orbit 904 is a low earth orbit (LEO). In this illustration, orbit 904 is depicted with an arc pointed to the right. A first satellite (SAT1) 902a is leading (ahead of) a second satellite (SAT2) 902b in the orbit 904.

The satellite 902 may comprise a structural system 912, a control system 914, a power system 916, a maneuvering system 918, and a communication system 920. In other implementations, some systems may be omitted, or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 916. The structural system 912 may also provide for thermal control to maintain components of the satellite 902 within operational temperature ranges. For example, the structural system 912 may include louvers, heat sinks, radiators, and so forth.

The control system 914 provides various services, such as operating the onboard systems, resource management, providing telemetry, processing commands, and so forth. For example, the control system 914 may direct the operation of the communication system 920.

The power system 916 provides electrical power to operate the components onboard the satellite 902. The power system 916 may include components to generate electrical energy. For example, the power system 916 may comprise one or more photovoltaic cells, thermoelectric devices, fuel cells, and so forth. The power system 916 may include components to store electrical energy. For example, the power system 916 may comprise one or more batteries, fuel cells, and so forth.

The maneuvering system 918 maintains the satellite 902 in one or more of a specified orientation or orbit 904. For example, the maneuvering system 918 may stabilize the satellite 902 with respect to one or more axis. In another example, the maneuvering system 918 may move the satellite 902 to a specified orbit 904. The maneuvering system 918 may include one or more computing devices, sensors, thrusters, momentum wheels, solar sails, drag devices, and so forth. For example, the sensors of the maneuvering system 918 may include one or more global navigation satellite system (GNSS) receivers, such as global positioning system (GPS) receivers, to provide information about the position and orientation of the satellite 902 relative to Earth. In another example, the sensors of the maneuvering system 918 may include one or more star trackers, horizon detectors, and so forth. The thrusters may include, but are not limited to, cold gas thrusters, hypergolic thrusters, solid-fuel thrusters, ion thrusters, arcjet thrusters, electrothermal thrusters, and so forth.

The communication system 920 provides communication with one or more other devices, such as other satellites 902, ground stations 906, user terminals 908, and so forth. The communication system 920 may include one or more modems, digital signal processors, power amplifiers, antennas (including at least one antenna that implements multiple antenna elements, such as a phased array antenna and an embedded calibration antenna), processors, memories, storage devices, communications peripherals, interface buses, and so forth. Such components support communications with other satellites 902, ground stations 906, user terminals 908, and so forth, using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 920 may be output to other systems, such as the control system 914, for further processing. Output from a system, such as the control system 914, may be provided to the communication system 920 for transmission.

One or more ground stations 906 are in communication with one or more satellites 902. The ground stations 906 may pass data between the satellites 902, a management system 922, networks such as the Internet, and so forth. The ground stations 906 may be emplaced on land, on vehicles, at sea, and so forth. Each ground station 906 may comprise a communication system 924. Each ground station 906 may use the communication system 924 to establish communication with one or more satellites 902, other ground stations 906, and so forth. The ground station 906 may also be connected to one or more communication networks. For example, the ground station 906 may connect to a terrestrial fiber optic communication network. The ground station 906 may function as a network gateway, passing user data 936 or other data between the one or more communication networks and the satellites 902. Such data may be processed by the ground station 906 and communicated via the communication system 924. The communication system 924 of a ground station may include components similar to those of the communication system 920 of a satellite 902 and may perform similar communication functionalities. For example, the communication system 924 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 906 are in communication with a management system 922. The management system 922 is also in communication, via the ground stations 906, with the satellites 902 and the UTs 908. The management system 922 coordinates the operation of the satellites 902, ground stations 906, UTs 908, and other resources of the communication system 900. The management system 922 may comprise one or more of an orbital mechanics system 928 or a scheduling system 932. In some embodiments, the scheduling system 932 can operate in conjunction with an HD controller.

The orbital mechanics system 928 determines orbital data 930 that is indicative of a state of a particular satellite 902 at a specified time. In one implementation, the orbital mechanics system 928 may use orbital elements that represent characteristics of the orbit 904 of the satellites 902 in the constellation to determine the orbital data 930 that predicts location, velocity, and so forth of particular satellites 902 at particular times or time intervals. For example, the orbital mechanics system 928 may use data obtained from actual observations from tracking stations, data from the satellites 902, scheduled maneuvers, and so forth to determine the orbital elements. The orbital mechanics system 928 may also consider other data, such as space weather, collision mitigation, orbital elements of known debris, and so forth.

The scheduling system 932 schedules resources to provide communication to the UTs 908. For example, the scheduling system 932 may determine handover data that indicates when communication is to be transferred from the first satellite 902*a* to the second satellite 902*b*. Continuing the example, the scheduling system 932 may also specify communication parameters such as frequency, timeslot, and so forth. During operation, the scheduling system 932 may use information such as the orbital data 930, system status data 934, user terminal data 926, and so forth.

The system status data 934 may comprise information such as which UTs 908 are currently transferring data, satellite availability, current satellites 902 in use by respective UTs 908, capacity available at particular ground stations 906, and so forth. For example, the satellite availability may comprise information indicative of satellites 902 that are available to provide communication service or those satellites 902 that are unavailable for communication service. Continuing the example, a satellite 902 may be unavailable due to malfunction, previous tasking, maneuvering, and so forth. The system status data 934 may be indicative of past status, predictions of future status, and so forth. For example, the system status data 934 may include information such as projected data traffic for a specified interval of time based on previous transfers of user data 936. In another example, the system status data 934 may be indicative of future statuses, such as a satellite 902 being unavailable to provide communication service due to scheduled maneuvering, scheduled maintenance, scheduled decommissioning, and so forth.

The user terminal data 926 may comprise information such as a location of a particular UT 908. The user terminal data 926 may also include other information such as a priority assigned to user data 936 associated with that UT 908, information about the communication capabilities of that particular UT 908, and so forth. For example, a particular UT 908 in use by a business may be assigned a higher priority relative to a UT 908 operated in a residential setting. Over time, different versions of UTs 908 may be deployed, having different communication capabilities such as being able to operate at particular frequencies, supporting different signal encoding schemes, having different antenna configurations, and so forth.

The UT 908 includes a communication system 938 to establish communication with one or more satellites 902. The communication system 938 of the UT 908 may include components similar to those of the communication system 920 of a satellite 902 and may perform similar communication functionalities. For example, the communication system 938 may include one or more modems, digital signal processors, power amplifiers, antennas (including at least one antenna that implements multiple antenna elements, such as a phased array antenna), processors, memories, storage devices, communications peripherals, interface buses, and so forth. The UT 908 passes user data 936 between the constellation of satellites 902 and the user device 910. The user data 936 includes data originated by the user device 910 or addressed to the user device 910. The UT 908 may be fixed or in motion. For example, the UT 908 may be used at a residence or on a vehicle such as a car, boat, aerostat, drone, airplane, and so forth.

The UT 908 includes a tracking system 940. The tracking system 940 uses almanac data 942 to determine tracking data 944. The almanac data 942 provides information indicative of orbital elements of the orbit 904 of one or more satellites 902. For example, the almanac data 942 may comprise orbital elements such as "two-line element" data for the satellites 902 in the constellation that are broadcast or otherwise sent to the UTs 908 using the communication system 938.

The tracking system 940 may use the current location of the UT 908 and the almanac data 942 to determine the tracking data 944 for the satellite 902. For example, based on the current location of the UT 908 and the predicted position and movement of the satellites 902, the tracking system 940 can calculate the tracking data 944. The tracking data 944 may include information indicative of azimuth, elevation, distance to the second satellite, time of flight correction, or other information at a specified time. The determination of the tracking data 944 may be ongoing. For example, the first UT 908 may determine tracking data 944 every 1000 ms, every second, every five seconds, or at other intervals.

With regard to FIG. 9, an uplink is a communication link that allows data to be sent to a satellite 902 from a ground station 906, UT 908, or a device other than another satellite 902. Uplinks are designated as UL1, UL2, UL3, and so forth. For example, UL1 is a first uplink from the ground station 906 to the second satellite 902*b*. In comparison, a downlink is a communication link that allows data to be sent from the satellite 902 to a ground station 906, UT 908, or device other than another satellite 902. For example, DL1 is a first downlink from the second satellite 902*b* to the ground station 906. The satellites 902 may also be in communication with one another. For example, a crosslink 946 provides for communication between satellites 902 in the constellation.

The satellite 902, the ground station 906, the user terminal 908, the user device 910, the management system 922, or other systems described herein may include one or more computer devices or computer systems comprising one or more hardware processors, computer-readable storage media, and so forth. For example, the hardware processors may include application-specific integrated circuits (ASICs), field-programmable gate arrays (FPGAs), microcontrollers, digital signal processors (DSPs), and so forth. The computer-readable storage media can include system memory, which may correspond to any combination of volatile and/or non-volatile memory or storage technologies. The system memory can store information that provides an operating system, various program modules, program data, and/or other software or firmware components.

In one embodiment, the system memory stores instructions of methods to control the operation of the electronic device. The electronic device performs functions using the processor(s) to execute instructions provided by the system memory. Embodiments may be provided as a software program or computer program, including a non-transitory computer-readable storage medium having stored thereon instructions (in compressed or uncompressed form) that may be used to program a computer (or other electronic devices) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further embodiments may also be provided as a computer program product, including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise the transmission of software by the Internet.

Figure 10:
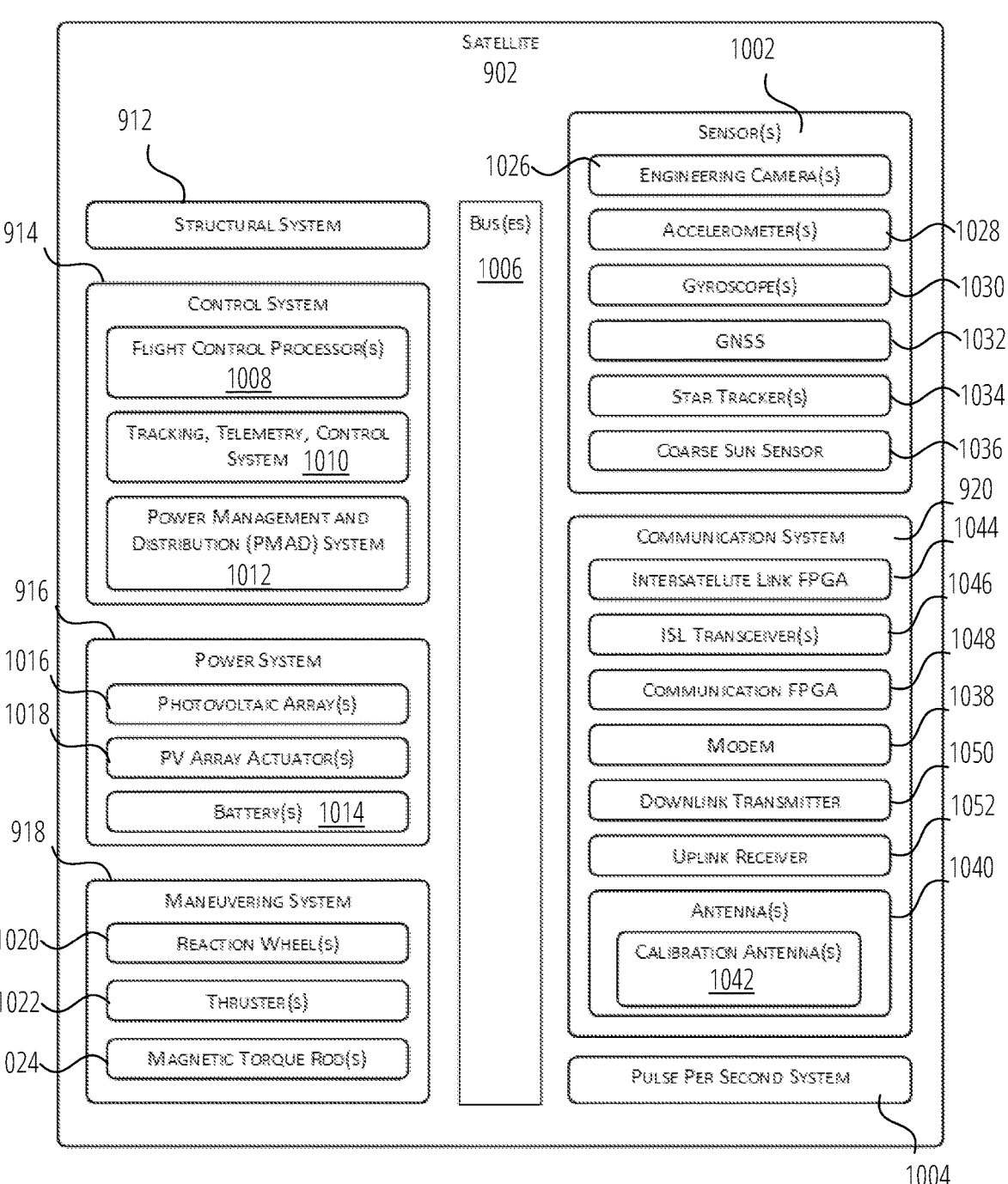
FIG. 10 is a functional block diagram of some systems associated with the satellite, according to some implementations.

FIG. 10 is a functional block diagram of some systems associated with the satellite 902, according to some implementations. The satellite 902 may comprise a structural system 912, a control system 914, a power system 916, a maneuvering system 918, one or more sensor(s) 1002, and a communication system 920. A pulse per second (PPS) system 1004 may be used to provide a timing reference to the systems onboard the satellite 902. One or more bus(es) 1006 may be used to transfer data between the systems onboard the satellite 902. In some implementations, redundant busses may be provided. The bus(es) 1006 may include, but are not limited to, data busses such as Controller Area Network Flexible Data Rate (CAN FD), Ethernet, Serial Peripheral Interface (SPI), and so forth. In some implementations, the bus(es) 1006 may carry other signals. For example, a radio frequency bus may comprise a coaxial cable, waveguides, and so forth to transfer radio signals from one part of the satellite 902 to another. In other implementations, some systems may be omitted, or other systems added. One or more of these systems may be communicatively coupled with one another in various combinations.

The structural system 912 comprises one or more structural elements to support the operation of the satellite 902. For example, the structural system 912 may include trusses, struts, panels, and so forth. The components of other systems may be affixed to or housed by the structural system 912. For example, the structural system 912 may provide mechanical mounting and support for solar panels in the power system 916. The structural system 912 may also provide for thermal control to maintain components of the satellite 902 within operational temperature ranges. For example, the structural system 912 may include louvers, heat sinks, radiators, and so forth.

The control system 914 provides various services, such as operating the onboard systems, resource management, providing telemetry, processing commands, and so forth. For example, the control system 914 may direct the operation of the communication system 920. The control system 914 may include one or more flight control processors 1008. The flight control processors 1008 may comprise one or more processors, FPGAs, and so forth. A tracking, telemetry, and control (TTC) system 1010 may include one or more processors, radios, and so forth. For example, the TTC system 1010 may comprise a dedicated radio transmitter and receiver to receive commands from a ground station 906, send telemetry to the ground station 906, and so forth. A power management and distribution (PMAD) system 1012 may direct the operation of the power system 916, control distribution of power to the systems of the satellite 902, control battery 1014 charging, and so forth.

The power system 916 provides electrical power to operate the components onboard the satellite 902. The power system 916 may include components to generate electrical energy. For example, the power system 916 may comprise one or more photovoltaic arrays 1016 comprising a plurality of photovoltaic cells, thermoelectric devices, fuel cells, and so forth. One or more PV array actuators 1018 may be used to change the orientation of the photovoltaic array(s) 1016 relative to the satellite 902. For example, the PV array actuator 1018 may comprise a motor. The power system 916 may include components to store electrical energy. For example, the power system 916 may comprise one or more batteries 1014, fuel cells, and so forth.

The maneuvering system 918 maintains the satellite 902 in one or more of a specified orientation or orbit 904. For example, the maneuvering system 918 may stabilize the satellite 902 with respect to one or more axes. In another example, the maneuvering system 918 may move the satellite 902 to a specified orbit 904. The maneuvering system 918 may include one or more of reaction wheel(s) 1020, thrusters 1022, magnetic torque rods 1024, solar sails, drag devices, and so forth. The thrusters 1022 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 916 to expel the water and produce thrust. During operation, the maneuvering system 918 may use data obtained from one or more of the sensor(s) 1002.

The satellite 902 includes one or more sensor(s) 1002. The sensor(s) 1002 may include one or more engineering cameras 1026. For example, an engineering camera 1026 may be mounted on the satellite 902 to provide images of at least a portion of the photovoltaic PV array 1016. Accelerometer(s) 1028 provide information about the acceleration of the satellite 902 along one or more axes. Gyroscope(s) 1030 provide information about the rotation of the satellite 902 with respect to one or more axes. The sensor(s) 1002 may include a global navigation satellite system (GNSS) receiver 1032, such as a Global Positioning System (GPS) receiver, to provide information about the position of the satellite 902 relative to Earth. In some implementations, the GNSS receiver 1032 may also provide information indicative of velocity, orientation, and so forth. One or more star tracker(s) 1034 may be used to determine an orientation of the satellite 902. A coarse sun sensor 1036 may be used to detect the sun, provide information on the relative position of the sun with respect to the satellite 902, and so forth. The satellite 902 may include other sensor(s) 1002 as well. For example, the satellite 902 may include a horizon detector, radar, lidar, and so forth.

The communication system 920 provides communication with one or more other devices, such as other satellites 902, ground stations 906, user terminals 908, and so forth. The communication system 920 may include one or more modems 1038, digital signal processors, power amplifiers, antennas antenna 1040 (including a calibration antenna 1042), such as a phased array antenna), processors, memories, storage devices, communications peripherals, interface buses, and so forth. Such components support communications with other satellites 902, ground stations 906, user terminals 908, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 920 may be output to other systems, such as the control system 914, for further processing. Output from a system, such as the control system 914, may be provided to the communication system 920 for transmission.

The communication system 920 may include hardware to support the crosslink 946 (e.g., intersatellite link). For example, an intersatellite link FPGA 1044 may be used to modulate data sent and received by one or more ISL transceiver(s) 1046 to send data between satellites 902. The ISL transceiver(s) 1046 may operate using radio frequencies, optical frequencies, and so forth.

A communication FPGA 1048 may be used to facilitate communication between the satellite 902 and the ground stations 906, UTs 908, and so forth. For example, the communication FPGA 1048 may direct the operation of a modem 1038 to modulate signals sent using a downlink transmitter 1050 and demodulate signals received using an uplink receiver 1052. The satellite 902 may include one or more antennas antenna 1040. For example, one or more parabolic antennas may be used to provide communication between the satellite 902 and one or more ground stations 906. In another example, a phased array antenna may be used to provide communication between the satellite 902 and the UTs 908.

Figure 11:
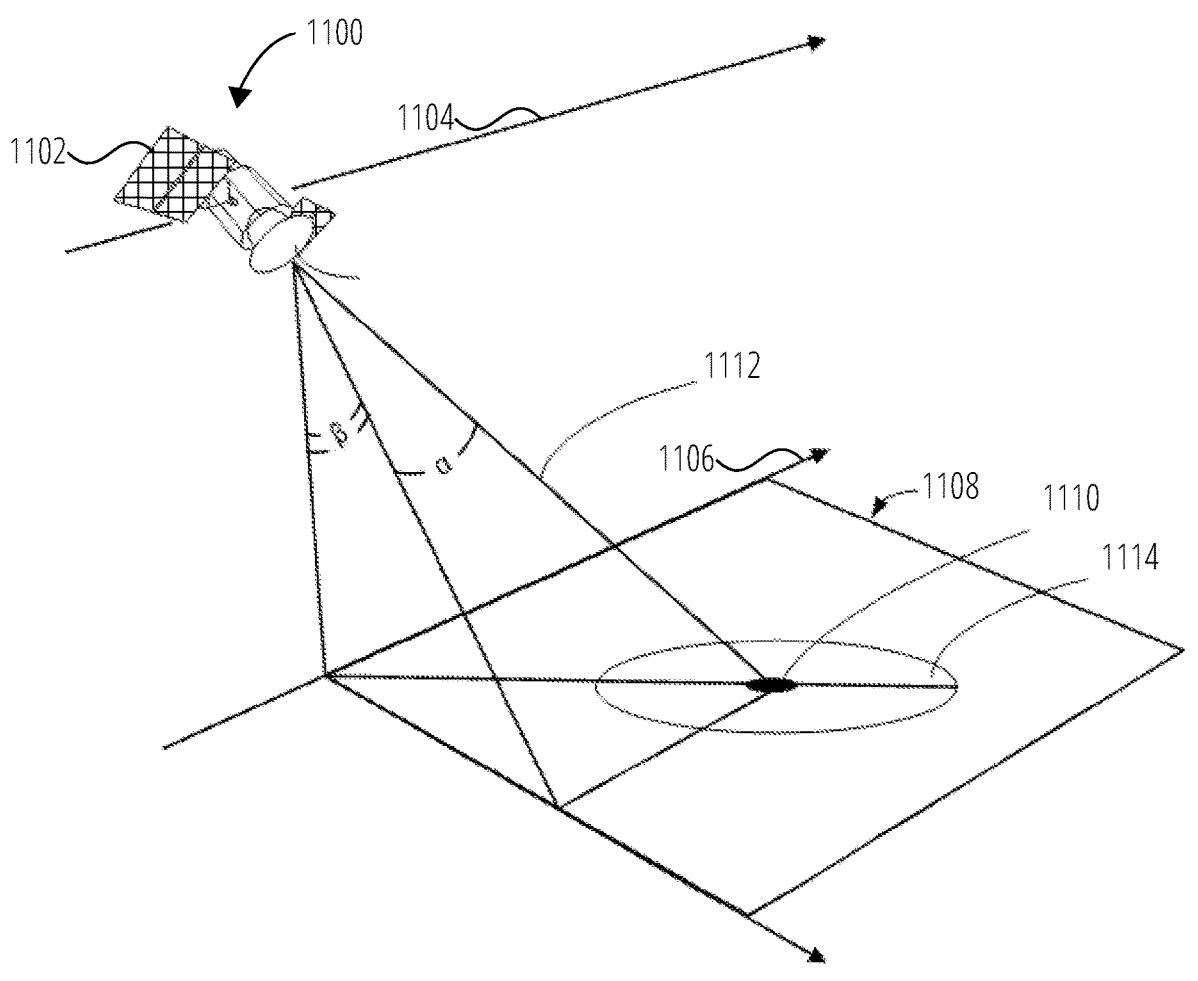
FIG. 11 illustrates a satellite including an antenna system that is steerable, according to embodiments of the present disclosure.

FIG. 11 illustrates the satellite 1100 including an antenna system 1102 that is steerable according to embodiments of the present disclosure. The satellite 1100 can be the SAT 104 of the satellite network 100 of FIG. 1. The antenna system 1102 may include multiple antenna elements that form an antenna that can be mechanically or electrically steered individually or collectively, or a combination thereof. In an example, the antenna is a phased array antenna.

In orbit 904, the satellite 1100 follows a path 1104, the projection of which onto the surface of the Earth forms a ground path 1106. In the example illustrated in FIG. 11, the ground path 1106 and a projected axis extending orthogonally from the ground path 1106 at the position of the satellite 1100, together define a region 1108 of the surface of the Earth. In this example, the satellite 1100 can establish uplink and downlink communications with one or more of ground stations, user terminals, or other devices within the region 1108. In some embodiments, the region 1108 may be located in a different relative position to the ground path 1106 and the position of the satellite 1100. For example, the region 1108 may describe a region of the surface of the Earth directly below the satellite 1100. Furthermore, embodiments may include communications between the satellite 1100, an airborne communications system, and so forth.

As shown in FIG. 11, a communication target 1110 (e.g., a ground station, a user terminal, or a CT (such as an HD CT)) is located within the region 1108. The satellite 1100 controls the antenna system 1102 to steer transmission and reception of communications signals to selectively communicate with the communication target 1110. For example, in a downlink transmission from the satellite 1100 to the communication target 1110, a signal beam 1112 emitted by the antenna system 1102 is steerable within an area 1114 of the region 1108. In some implementations, the signal beam 1112 may include multiple subbeams. The extents of the area 1114 define an angular range within which the signal beam 1112 is steerable, where the direction of the signal beam 1112 is described by a beam angle "α" relative to a surface normal vector of the antenna system 1102. In two-dimensional phased array antennas, the signal beam 1112 is steerable in two dimensions, described in 15 by a second angle "β" orthogonal to the beam angle α. In this way, the area 1114 is a two-dimensional area within the region 1108, rather than a linear track at a fixed angle determined by the orientation of the antenna system 1102 relative to the ground path 1106.

In FIG. 11, as the satellite 1100 follows the path 1104, the area 1114 tracks along the surface of the Earth. In this way, the communication target 1110, which is shown centered in the area 1114 for clarity, is within the angular range of the antenna system 1102 for a period of time. During that time, signals communicated between the satellite 1100 and the communication target 1110 are subject to bandwidth constraints, including but not limited to signal strength and calibration of the signal beam 1112. In an example, for phased array antenna systems, the signal beam 1112 is generated by an array of mutually coupled antenna elements, wherein constructive and destructive interference produce a directional beam. Among other factors, phase drift, amplitude drift (e.g., of a transmitted signal in a transmitter array), and so forth affect the interference properties and thus the resultant directional beam or subbeam.

Figure 12:
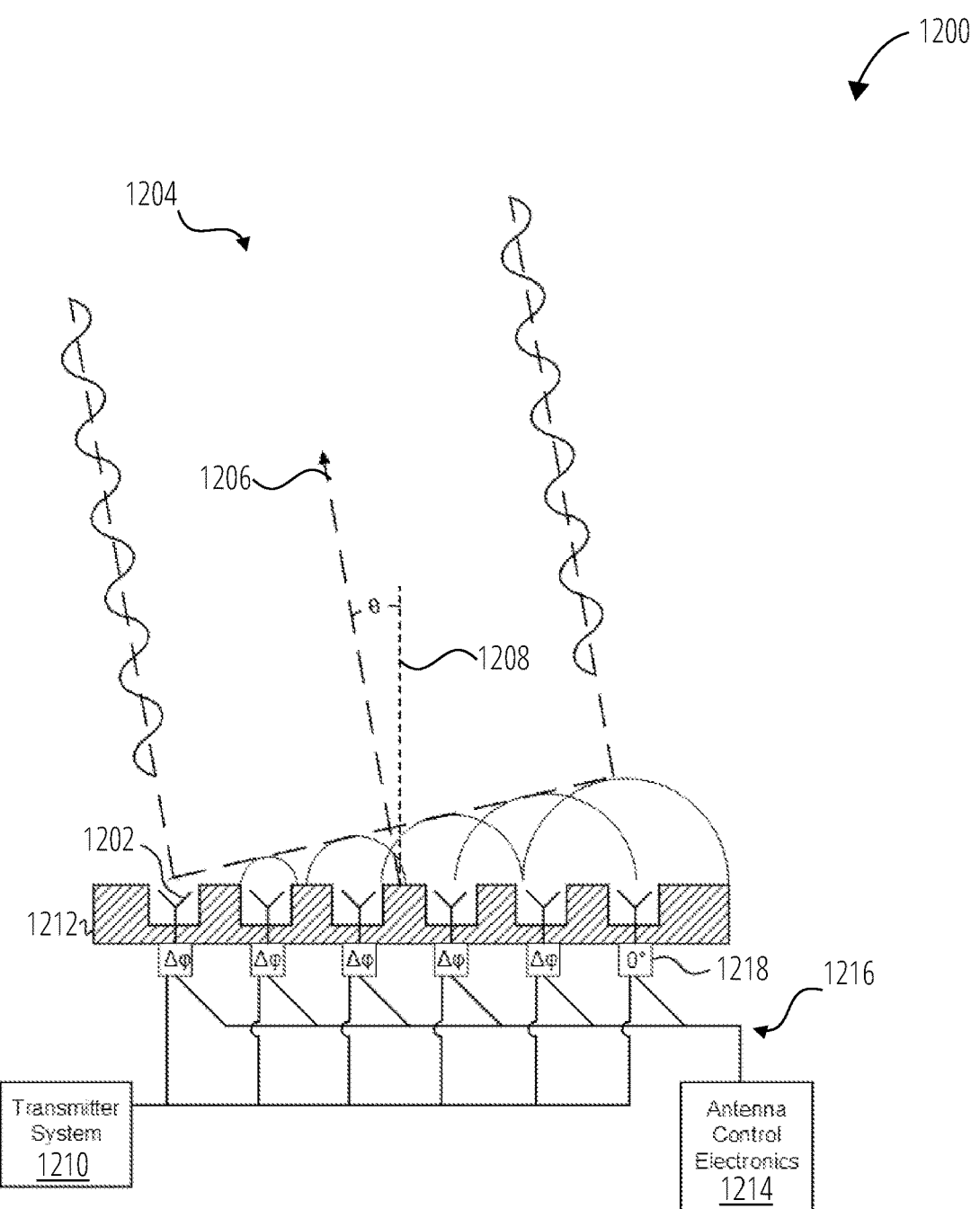
FIG. 12 illustrates a simplified schematic of an antenna, according to embodiments of the present disclosure.

FIG. 12 illustrates a simplified schematic of an antenna 1200, according to embodiments of the present disclosure. The antenna 1200 may be a component of the antenna system 1102 of FIG. 11. As illustrated, the antenna 1200 is a phased array antenna that includes multiple antenna elements 1202. Interference between the antenna elements 1202 forms a directional radiation pattern in both transmitter and receiver arrays, forming a beam 1204 (beam extents shown as dashed lines). The beam 1204 is a portion of a larger transmission pattern (not shown) that extends beyond the immediate vicinity of the antenna 1200. The beam 1204 is directed along a beam vector 1206, described by an angle "θ" relative to an axis 1208 normal to a surface of the antenna 1200. As described below, the beam 1204 is one or more of steerable or shapeable through control of operating parameters including, but not limited to, a phase and an amplitude of each antenna element 1202.

In FIG. 12, the antenna 1200 includes, within a transmitter section 1212, the antenna elements 1202, which may include, but are not limited to, omnidirectional transmitter antennas coupled to a transmitter system 1210, such as the downlink transmitter 1050 of FIG. 10. The transmitter system 1210 provides a signal, such as a downlink signal to be transmitted to a ground station on the surface. The downlink signal is provided to each antenna element 1202 as a time-varying signal that may include several multiplexed signals. To steer the beam 1204 relative to the axis 1208, the antenna 1200 (e.g., phased array antenna system) includes antenna control electronics 1214 controlling a radio frequency (RF) feeding network 1216, including multiple signal conditioning components 1218 interposed between the antenna elements 1202 and the transmitter system 1210. The signal conditioning components 1218 introduce one or more of a phase modulation or an amplitude modulation (e.g., by phase shifters), as denoted by "Δφ" in FIG. 12, to the signal sent to the antenna elements 1202. As shown in FIG. 12, introducing a progressive phase modulation produces interference in the individual transmission of each antenna element 1202 that generates the beam 1204.

The phase modulation imposed on each antenna element 1202 can differ and can be dependent on a spatial location of a communication target that determines an optimum beam vector (e.g., where the beam vector 1206 is found by one or more of maximizing signal intensity or connection strength). The optimum beam vector may change with time as the communication target 1110 moves relative to the antenna 1200 (e.g., phased array antenna system).

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A customer terminal (CT) comprising:
an array antenna;
beamforming circuitry coupled to the array antenna;
a processing device coupled to the beamforming circuitry, wherein the processing device:
   receives, at a first time, first timing information and first position information from a global navigation satellite system (GNSS), wherein a first clock of the CT is based on the first timing information and the first position information;
   establishes, using the first timing information and the first position information, a communication link with a satellite (SAT);
   receives, from the SAT, second position information at a second time after the first time and first velocity information of the SAT at the second time;
   determines, using the first timing information and the first position information, third position information of the CT at the second time and second velocity information of the CT at the second time;
   determines, using the second position information and the third position information, a slant range vector between the SAT and the CT at the second time, the slant range vector comprising a magnitude and a direction, wherein the magnitude represents a physical distance between the SAT and the CT;
   determines, using the magnitude of the slant range vector and a physical distance between the SAT and the Earth, an azimuth direction from the beamforming circuitry to the SAT;
   determines that additional timing information and additional position information are not received from the GNSS at a third time after the first time;
   receives second timing information and fourth position information from the SAT over the communication link; and
   updates the first clock of the CT using the second timing information and the fourth position information.

2. The CT of claim 1, wherein the processing device further:
   receives a first message from the SAT over the communication link;
   sends a second message to the SAT over the communication link;
   receives the second timing information comprising a roundtrip time (RTT) that represents a difference between a first timestamp associated with the first message being sent by the SAT and a second timestamp associated with the second message being received by the SAT;

determines a carrier frequency offset (CFO) estimate using a downlink signal with a carrier frequency from the SAT; and determines, using the CFO estimate and the RTT, (i) a radial velocity of the CT in the direction of the slant range vector and (ii) a constant representing a clock drift between a second clock of the SAT and the first clock of the CT.

3. A method of operating a customer terminal (CT), the method comprising:

establishing a communication link with a satellite (SAT) using position and velocity information of the CT;

receiving, at a first time, first timing information from a global navigation satellite system (GNSS);

updating, using the first timing information, a first clock of the CT;

exchanging, over the communication link, messages between the CT and the SAT;

determining an outage of the GNSS after the first time;

determining, at a second time after the first time, second timing information, representing a clock drift between the first clock of the CT and a second clock of the SAT, from the messages exchanged between the SAT and the CT over the communication link prior to the second time; and updating, using the second timing information, the first clock of the CT.

4. The method of claim 3, wherein determining the outage of the GNSS comprises determining that third timing information is not received from the GNSS at a third time after the first time, wherein the third time is before the second time.

5. The method of claim 3, further comprising maintaining the communication link, wherein maintaining the communication link comprises:

receiving, before the second time, first position information and first velocity information of the SAT from the SAT;

determining current position information of the CT using prior position information of the CT and second velocity information of the CT;

determining, using the first position information and the current position information (i) a direction from the CT to the SAT and (ii) a first physical distance between the CT and the SAT; and determining, using the first physical distance and a second physical distance between the SAT and the Earth, an azimuth direction from beamforming circuitry of the CT to the SAT, wherein the communication link is maintained using the azimuth direction.

6. The method of claim 3, further comprising:

receiving, from the SAT, position and timing information of a second SAT; and establishing, using the position and timing information of the second SAT, a second communication link with the second SAT.

7. The method of claim 3, wherein determining the second timing information comprises, prior to the second time:

receiving a first message from the SAT;

sending a second message to the SAT;

receiving a roundtrip time (RTT) that represents a difference between a first timestamp associated with the first message being sent by the SAT and a second timestamp associated with the second message being received by the SAT;

determining a carrier frequency offset (CFO) estimate using a downlink signal from the SAT; and determining, using the CFO estimate and the RTT, (i) a radial velocity of the CT in a direction between the CT and the SAT and (ii) a constant representing the clock drift between the first clock of the CT and the second clock of the SAT.

8. The method of claim 3, further comprising:

determining first position information of the CT at a third time using first velocity information of the CT at the third time and second position information of the CT at a fourth time before the third time;

determining third position information of the SAT at the third time using second velocity information of the SAT at the third time and fourth position information of the SAT at the fourth time;

determining, using (i) a difference in the second velocity information and the first velocity information, (ii) a difference in time between the third time and the fourth time, (iii) a first direction from the CT to the SAT at the third time, and (iv) a first physical distance between the CT and the SAT at the third time, a second physical distance between the CT and the SAT at the fourth time; and determining a second direction from the CT to the SAT at the fourth time, the second direction representing an azimuth direction from beamforming circuitry of the CT to the SAT, wherein the communication link is maintained using the azimuth direction.

9. The method of claim 8, wherein determining the second direction comprises:

determining a third physical distance between the SAT and the Earth in a Zenith axis;

determining, using (i) the second physical distance and (ii) the third physical distance, an angle between the SAT and the Zenith axis; and determining, using the angle between the SAT and the Zenith axis, the second direction.

10. The method of claim 8, wherein determining the second timing information comprises:

receiving a roundtrip time (RTT) that represents a difference between a first timestamp associated with a first message being sent by the SAT and a second timestamp associated with a second message being received by the SAT;

determining a carrier frequency offset (CFO) estimate using a downlink signal with a carrier frequency from the SAT; and determining, using the CFO estimate and the RTT, (i) a radial velocity of the CT in the second direction and (ii) a constant representing the clock drift between the first clock of the CT and the second clock of the SAT.

11. The method of claim 3, wherein determining the second timing information further comprising:

receiving a signal from the SAT;

determining a first carrier frequency of the signal;

determining, using a Doppler shift, a second carrier frequency of the signal;

determining, using the first carrier frequency and the second carrier frequency, a carrier frequency offset (CFO) estimate;

receiving a roundtrip time (RTT) from the SAT; and determining, using the CFO estimate and the RTT, the clock drift.

12. A customer terminal (CT) comprising:

an array antenna;

beamforming circuitry coupled to the array antenna;

a processing device coupled to the beamforming circuitry, wherein the processing device:

establish a communication link with a satellite (SAT) using position and velocity information of the CT;

receive, at a first time, first timing information from a global navigation satellite system (GNSS);

update, using the first timing information, a first clock of the CT;

exchange, over the communication link, messages between the CT and the SAT;

determine an outage of the GNSS after the first time;

determine, at a second time after the first time, second timing information, representing a clock drift between the first clock of the CT and a second clock of the SAT, from the messages exchanged between the SAT and the CT prior to the second time; and update, using the second timing information, the first clock of the CT.

13. The CT of claim 12, wherein the processing device, to determine the outage of the GNSS, is further to determine that third timing information is not received at a third time after the first time, wherein the third time is before the second time.

14. The CT of claim 12, wherein the processing device, to determine the outage of the GNSS, is further to determine that third timing information is not received from the GNSS at a third time after the first time, wherein the third time is before the second time.

15. The CT of claim 12, wherein the processing device is further to maintain the communication link by:

receiving, before the second time, first position information and first velocity information of the SAT from the SAT;

determining current position information of the CT using prior position information of the CT and second velocity information of the CT;

determining, using the first position information and the current position information (i) a direction from the CT to the SAT and (ii) a first physical distance between the CT and the SAT; and determining, using the first physical distance and a second physical distance between the SAT and the Earth, an azimuth direction from beamforming circuitry of the CT to the SAT, wherein the communication link is maintained using the azimuth direction.

16. The CT of claim 12, wherein the processing device, to determine the second timing information prior to the second time, is further to:

receive a first message from the SAT;

send a second message to the SAT;

receive a roundtrip time (RTT) that represents a difference between a first timestamp associated with the first message being sent by the SAT and a second timestamp associated with the second message being received by the SAT;

determine a carrier frequency offset (CFO) estimate using a downlink signal from the SAT; and determine, using the CFO estimate and the RTT, (i) a radial velocity of the CT in a direction between the CT and the SAT and (ii) a constant representing the clock drift between the first clock of the CT and the second clock of the SAT.

17. The CT of claim 12, wherein the processing device is further to:

determine first position information of the CT at a third time using first velocity information of the CT at the third time and second position information of the CT at a fourth time before the third time;

determine third position information of the SAT at the third time using second velocity information of the SAT at the third time and fourth position information of the SAT at the fourth time;

determine, using (i) a difference in the second velocity information and the first velocity information, (ii) a difference in time between the third time and the fourth time, (iii) a first direction from the CT to the SAT at the third time, and (iv) a first physical distance between the CT and the SAT at the third time, a second physical distance between the CT and the SAT at the fourth time; and determine a second direction from the CT to the SAT at the fourth time, the second direction representing an azimuth direction from beamforming circuitry of the CT to the SAT, wherein the communication link is maintained using the azimuth direction.

18. The CT of claim 17, wherein the processing device, to determine the direction, is to:

determine a third physical distance between the SAT and the Earth in a Zenith axis;

determine, using (i) the second physical distance and (ii) the third physical distance, an angle between the SAT and the Zenith axis; and determine, using the angle between the SAT and the Zenith axis, the second direction.

19. The CT of claim 17, wherein the processing device, to determine the second timing information, is further to:

receive a roundtrip time (RTT) that represents a difference between a first timestamp associated with a first message being sent by the SAT and a second timestamp associated with a second message being received by the SAT;

determine a carrier frequency offset (CFO) estimate using a downlink signal with a carrier frequency from the SAT; and determine, using the CFO estimate and the RTT, (i) a radial velocity of the CT in the second direction and (ii) a constant representing the clock drift between the first clock of the CT and the second clock of the SAT.

20. The CT of claim 12, wherein the processing device, to determine the second timing information is further to:

receive a signal from the SAT;

determine a first carrier frequency of the signal;

determine, using a Doppler shift, a second carrier frequency of the signal;

determine, using the first carrier frequency and the second carrier frequency, a carrier frequency offset (CFO) estimate;

receive a roundtrip time (RTT) from the SAT; and determine, using the CFO estimate and the RTT, the clock drift.

* * * * *